US012803893B2

(12) United States Patent
Ben Itay et al.

(10) Patent No.: US 12,803,893 B2
(45) Date of Patent: Nov. 17, 2026

(54) CLIENT TESTING USING NETWORK SIGNATURE COMPARISON

(71) Applicant: eBay Inc., San Jose, CA (US)

(72) Inventors: Meir Ben Itay, Sammamish, WA (US); Matthew Borkow, Alameda, CA (US)

(73) Assignee: eBay Inc., San Jose, CA (US)

( * ) Notice: Subject to any disclaimer, the term of this patent is extended or adjusted under 35 U.S.C. 154(b) by 35 days.

(21) Appl. No.: 18/968,879

(22) Filed: Dec. 4, 2024

(65) Prior Publication Data

US 2026/0156066 A1 Jun. 4, 2026

(51) Int. Cl.
*G06F 15/173* (2006.01)
*H04L 41/0604* (2022.01)
*H04L 43/50* (2022.01)

(52) U.S. Cl.
CPC .......... *H04L 43/50* (2013.01); *H04L 41/0627* (2013.01)

(58) Field of Classification Search
CPC ............................ H04L 43/50; H04L 41/0627
See application file for complete search history.

(56) References Cited

U.S. PATENT DOCUMENTS 8,621,615 B2 12/2013 Zhao
9,516,039 B1 12/2016 Yen et al.
11,070,453 B2 7/2021 Thiagarajan et al.
11,201,881 B2 12/2021 Janakiraman
2014/0150102 A1* 5/2014 Wang .................. H04L 63/1416 726/23
2018/0338010 A1* 11/2018 Llanos Alonso ....... G06F 21/56
2020/0374297 A1* 11/2020 Bilas .................. H04L 63/1433
2021/0014120 A1 1/2021 Apostolopoulos et al.
2022/0060509 A1 2/2022 Crabtree et al.
2024/0406733 A1* 12/2024 Balmakhtar ........ H04W 12/122

FOREIGN PATENT DOCUMENTS

CN 108923975 B 8/2021

OTHER PUBLICATIONS

Ainslie-Malik, "Understanding and Baselining Network Behaviour using Machine Learning—Part 1", Available at : <https://www.splunk.com/en_us/blog/>, Apr. 17, 2020, 13 pages.
Fei et al., "Identifying click-requests for the network-side through traffic behavior", Journal of Network and Computer Applications, vol. 173, 2021, 13 pages.

* cited by examiner

*Primary Examiner* — Joseph R Maniwang
(74) *Attorney, Agent, or Firm* — SHOOK, HARDY & BACON L.L.P.

(57) ABSTRACT

Some aspects of the present technology relate to technologies for performing client testing using network footprint comparison. In accordance with some configurations, a network proxy initiates a client-side network testing process associated with a network and an application where the network proxy intercepts outbound network requests from the application via the network. A network signature of the application is then generated using the outbound network requests and this network signature is compared to a baseline network signature. In accordance with some configurations, comparing the network signature comprises identifying variances in application-requested-inputs associated with the one or more outbound network requests. Based on this comparison, a client-side network test result is generated that can be used to identify variances in the application relative to the baseline network signature.

20 Claims, 12 Drawing Sheets

500

EDIT ITEM LISTING NETWORK SIGNATURE

```
getServiceRequest(uri: “location/search/home?”),
getServiceRequest(uri: “location/search/suggest?keyword=P”),
getServiceRequest(uri: “location/search/suggest?keyword=Pr”),
getServiceRequest(uri: “location/search/suggest?keyword=Pro”),
getServiceRequest(uri: “location/search/suggest?keyword=Prod”),
getServiceRequest(uri: “location/search/suggest?keyword=Produ”),
getServiceRequest(uri: “location/search/suggest?keyword=Produc”),
getServiceRequest(uri: “location/search/suggest?keyword=Product”),
getServiceRequest(uri: “location/search/suggest?keyword=Product%20”),
getServiceRequest(uri: “location/search/suggest?keyword=Product%20N”),
getServiceRequest(uri: “location/search/suggest?keyword=Product%20Na”),
getServiceRequest(uri: “location/search/suggest?keyword=Product%20Nam”),
getServiceRequest(uri: “location/search/suggest?keyword=Product%20Name”),
getAPIRequest(queryName: “SellingListingRoute”),
getServiceRequest(uri: “location/selling/get_mandate_details?options”),
getAPIRequest(queryName: “FindModel”),
getAPIRequest(queryName: “FetchAspects”),
getAPIRequest(queryName: “FetchData”),
getServiceRequest(uri: “location/selling/create_and_open?options)
getServiceRequest(uri: “location/selling/edit_draft?options)
```

*FIG. 5*

700

RETRY CREATE ITEM LISTING NETWORK SIGNATURE

```
getServiceRequest(uri: “location/search/home?”),
getServiceRequest(uri: “location/search/suggest?keyword=P”),
getServiceRequest(uri: “location/search/suggest?keyword=Pr”),
getServiceRequest(uri: “location/search/suggest?keyword=Pro”),
getServiceRequest(uri: “location/search/suggest?keyword=Prod”),
getServiceRequest(uri: “location/search/suggest?keyword=Produ”),
getServiceRequest(uri: “location/search/suggest?keyword=Produc”),
getServiceRequest(uri: “location/search/suggest?keyword=Product”),
getServiceRequest(uri: “location/search/suggest?keyword=Product%20”),
getServiceRequest(uri: “location/search/suggest?keyword=Product%20N”),
getServiceRequest(uri: “location/search/suggest?keyword=Product%20Na”),
getServiceRequest(uri: “location/search/suggest?keyword=Product%20Nam”),
getServiceRequest(uri: “location/search/suggest?keyword=Product%20Name”),
getAPIRequest(queryName: “SellingListingRoute”),
getAPIRequest(queryName: “FindModel”),
getAPIRequest(queryName: “FetchAspects”),
getAPIRequest(queryName: “FetchData”),
getServiceRequest(uri: “location/selling/get_mandate_details?options”),
getServiceRequest(uri: “location/selling/create_and_open?options)
getServiceRequest(uri: “location/selling/create_and_open?options)
```

*FIG. 7*

CLIENT TESTING USING NETWORK SIGNATURE COMPARISON

BACKGROUND

Client-server architectures are used extensively in computational systems where a client application makes requests to a server, over a network, and the server responds to those client requests. As these types of systems become larger, more complex, and more ubiquitous, it can become more difficult to locate and fix errors in the system. For example, a large and complex system may have a server with millions of records that can support access by thousands of simultaneous users using client applications on multiple different platforms. Errors in network requests from the client or in responses to those requests by the server can cause unpredictable results at any point in the system and the source of such errors can be difficult to identify. These errors can result in unnecessary client-server requests, thereby causing an increase usage of computing system resources and incorrect performance metrics performance for such systems.

SUMMARY

Various aspects of the present technology relate to, among other things, client testing using network signature comparison. This client testing can be used to test a client application tailored to an item listing system so that, for example, client tasks related to creating and maintaining an item listing (e.g., by a user of the item listing system) can be tested for correctness and efficiency. Client testing can start a test process that initiates an application workflow to, for example, create an item listing. This test process can create a network proxy that operates between the client application and a networking client of the application. As used herein, a networking client is an application or process that receives network requests from the client application and sends those requests to the server and that also receives responses from the server and sends those responses to the client application. The network proxy intercepts the network requests from the client application, records the network requests, and forwards the network requests on to the server. In some aspects, the responses to the network requests from the server are sent directly to the client application, bypassing the network proxy.

The recorded network requests are then used to generate a network signature for the client application where the network signature includes the network request data as well as metadata associated with the network requests (e.g., time of the request, type of request, etc.). When a new network test is created, or fabricated, the network signature is stored by the test process as a baseline network signature for the client application. Then, each subsequent network test of the client is performed, a new network signature can be compared to the baseline network signature. If the new network signature is the same as the baseline network signature, the network test of the client is successful. If the new network signature is not the same as the baseline network signature, the network test of the client fails, indicating that the client application has changed, either intentionally or unintentionally. This failure can identify errors in the client application. In some aspects where, for example, the change to the client application is intentional (e.g., due to further development), the new network signature can be stored as a new baseline network signature, providing a new metric for correct behavior of the client.

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

BRIEF DESCRIPTION OF THE DRAWINGS

The present technology is described in detail below with reference to the attached drawing figures, wherein.

DETAILED DESCRIPTION

Figure 1:
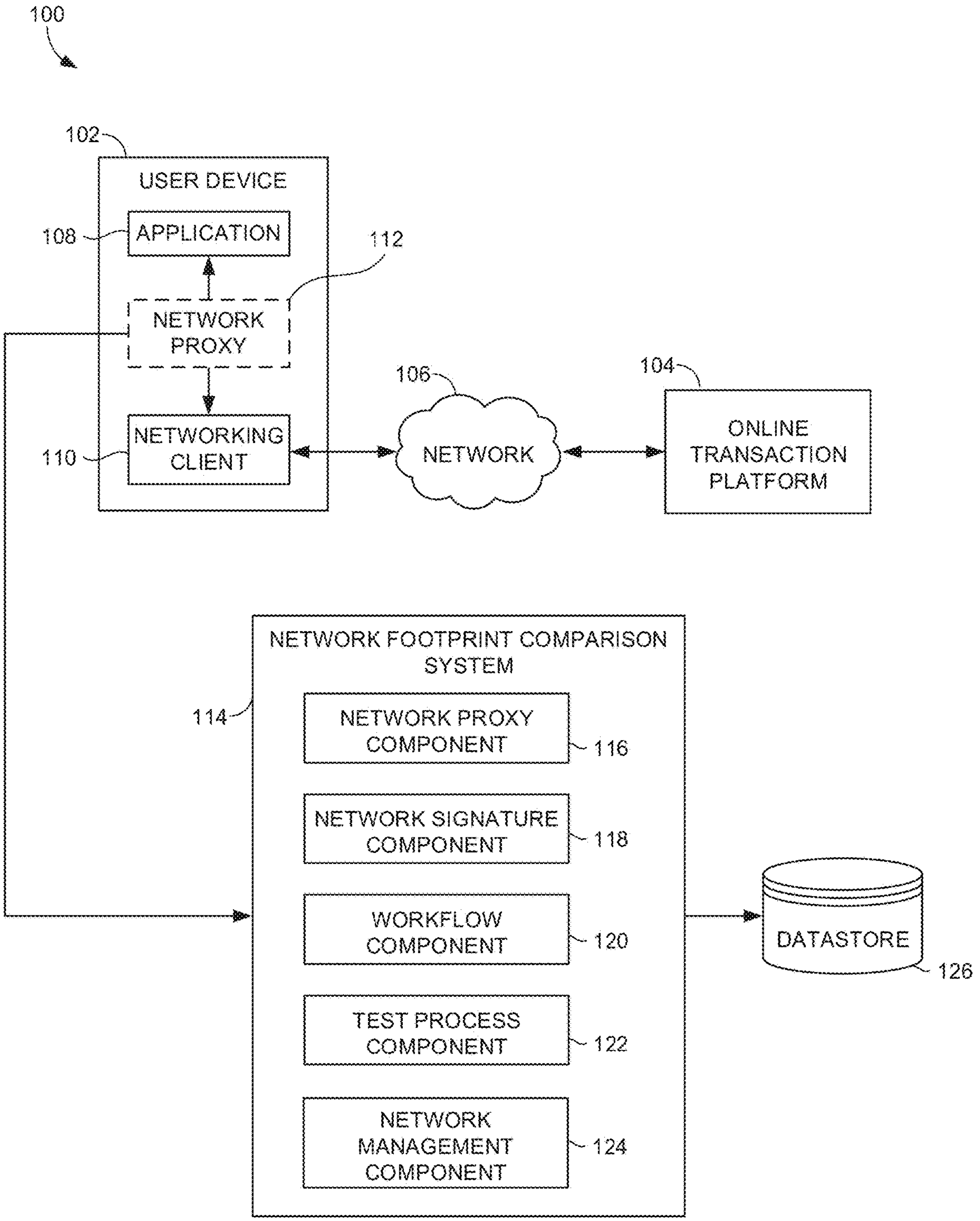
FIG. 1 provides a block diagram illustrating an exemplary system for performing testing using network signature comparison, in accordance with some implementations of the present disclosure.

Testing of software applications is important to ensure that the software applications generate correct and predictable data and to identify conditions where the behavior of the software applications has changed. Typically, testing can be performed on portions of applications so that, for example, a test can be fabricated that verifies that, given a specified input to an application, a specified output is obtained. When the application is executed, if the output that is obtained matches the specified output, the test passes. Conversely, if the output that is obtained does not match the specified output, the test does not pass, indicating a change in the behavior of the application.

Testing of client-server application, where the client sends requests to a server and the server provides responses to those requests can be complex. These tests can become increasingly complex as client-server applications grow larger, with a large amount of data that is displayed to many users, using different client applications on different platforms. Typical client-server testing approaches focus on tests of the responses from the server so that, for example, given a client request, a determination is made whether the server sends the correct response. These tests generally are of the form "if request A is received by the server, does response B get sent to the client?" The responses can be text, or graphics, or data, or some other such response and these tests are generally limited to testing the behavior of the server.

Any testing of client applications typically focuses on checking the client application output and verifying, for example, that the client application is correctly rendering data to the customer. Tests can also be fabricated to identify syntactically erroneous requests from the client, although these tests typically use a "catch all" approach where, if a request is not understood by the server, a general error is issued. These tests fail to fully test the client application since these tests cannot determine when a client is sending syntactically correct requests that are logically incorrect. For example, a client can generate a request to create a new item listing on an item listing system and one part of that creation process can be a request to create a new listing. This is a syntactically and logically correct request. Conversely, a client can generate a request to create and update an item listing, but rather than issuing a first request to create a new listing followed by multiple requests to update the listing, the client can erroneously issue a request to create a new listing for each update (e.g., to set the size, price, color, etc. of a product). These update requests are syntactically correct, but logically incorrect. Existing testing methods would fail to identify this error since they do not test the requests and, by failing to identify such an error, this could require using a significant amount of extra computing resources since, for example, a listing with ten or more updates could result in ten or more different item listings, each only partially correct.

It should be noted that, while the examples described herein are described with respect to an online transaction platform and an item listing system, these examples are for the purposes of illustration. As such, the systems and methods described herein are applicable to any platform, system, or service that has a client application and a server application and the systems and methods described herein may be used to perform client testing of any client using network footprint comparison. As may be contemplated, client testing of any client using network footprint comparison associated with such platforms, systems, and/or services can be considered as within the scope of the present disclosure.

In addition to causing inefficient use of computing resources (e.g., to maintain multiple unnecessary listings), incomplete testing of client applications can skew various performance metrics. In an item listing system, for example, various performance metrics of the service can be used to evaluate customer engagement and determine efficiency of the service. One such metric is to measure engagement of customers with various listings. A customer is less likely to engage with a partial listing (e.g., an incomplete listing) and, if a client erroneously generates many partial listings, overall customer engagement can fall dramatically. Similarly, a metric to measure how successful listings are (e.g., whether the listings result in sales) can also fall dramatically if, for each valid listing, there are several invalid partial listings that will not result in any sales.

Aspects of the technology described herein improve the ability to accurately and completely test client applications by testing the requests generated by the client application and verifying that those requests do not unintentionally change. Considering the example above, where a request to update an item listing erroneously issues a request to create a new listing rather than a request to update an existing listing, an expected client task to create and update a listing would include the client issuing a first request to create the listing followed by multiple requests to update the listing. This is the expected pattern for the task and any deviation from that expected pattern (e.g., where the client issues requests for new listings at each update) would indicate an error in the client software.

In accordance with some aspects of the technology described herein, testing of client applications can be performed using network signature comparison. Client application testing using network signature comparison proceeds by instantiating a test process that starts an application workflow. This test process creates a network proxy, which is a process or application that operates between the client application and a networking client of the client application. The network proxy intercepts the network requests from the client application, records the network requests, and forwards the network requests on to the server. The recorded network requests are then used to generate a network signature for the client application where the network signature includes the network request data as well as metadata associated with the network requests. When a new network test is fabricated, the network signature is stored in a datastore by the test process as a baseline network signature for the client application.

When subsequent network tests of the client are performed, a new network signature is generated that can be compared to the baseline network signature. If the new network signature is the same as the baseline network signature, the network test of the client is successful. If the new network signature is not the same as the baseline network signature, the network test of the client fails, indicating that the client application has changed. This failure can identify errors in the client application or can identify new baseline behavior for the client application. For example, when the change to the client application is intentional (e.g., due to new client development), the new network signature can be stored as a new baseline network signature, providing a new metric for correct behavior of the client.

In some aspects, the focus of the testing of the client application using network signature comparison is to ensure that the correct requests are made and in the correct order (e.g., if the requests are order dependent). Thus, this testing of the client application using network signature comparison is not focused on whether the server application sends correct responses to the requests but whether the client application is sending the correct requests. This testing of the client application using network signature comparison can be used to identify incorrect requests, redundant requests, to detect non-fatal errors that are reported by the client (e.g., in the form of network requests), and other such request errors. In some aspects, requests can be sent to a production (e.g., live) server which generates the responses. In some aspects, requests can be sent to a test server which generates the responses. In some aspects, requests can be sent to a mock server which generates canned test responses.

Aspects of the technology described herein provide a number of improvements over existing technologies. For instance, by testing the client application using network signature comparison, new changes in the behavior of the client application can be identified. By recording the client requests to the server, generating a network signature from those request, and comparing those requests to a known baseline, syntactically correct but logically incorrect requests can be identified. Identifying these erroneous requests by the client can prevent creation of erroneous records, thereby considerably improving usage of computing resources and improving the functioning of computer systems used to perform client-server tasks. Additionally, identifying such erroneous requests using existing methods can be time consuming and can require a significant amount of computing resources as such erroneous requests can generate unpredictable and hard-to-identify errors in the server data. These unpredictable and hard-to-identify errors in the server data can also require additional computing resources since they can artificially skew performance metrics of a system, thereby giving false metrics for efficiency and client engagement.

The following definitions are provided for illustrative purposes and are not intended to be limiting. These terms are provided for understanding the technical solution presented, particularly in the context of client-side network testing, application behavior analysis, and comparison with baseline network signatures. The definitions aim to clarify the key concepts and components involved in the methodology, ensuring a consistent understanding throughout the description of the technical solution.

Client-side network testing process: A process for testing outbound network requests generated by an application, with the goal of identifying deviations from a predefined baseline of network behaviors, to ensure correctness, consistency, and performance.

Network proxy: An intermediary that intercepts network traffic between a client (application) and the network, allowing for monitoring of the network requests and responses.

Outbound network request: A request sent by the application from the client to a server via the network, often containing application-requested inputs such as data, parameters, and headers, which the application uses for server communication.

Application-requested-inputs: The specific data that the application generates and sends within outbound network requests to the server. These inputs include values such as user input, application settings, or dynamically generated data. These inputs can also include parameters that the application generates and sends within outbound network requests to the server.

Network signature: A unique representation of an application's network behavior, generated by analyzing the outbound network requests and the application-requested inputs for a particular workflow. The network signature encapsulates characteristics such as the order, structure, and specification of the inputs.

Baseline network signature: A reference or "good" network signature, representing the expected or validated network behavior of the application based on previously recorded and monitored outbound requests during earlier development or testing phases.

Variance: Differences or discrepancies between the current network signature of the application and the baseline network signature. Variances are identified in application-requested inputs such as changes in types, formats, validation rules, or the structure of the data.

Client-side network test result: The outcome or report generated after comparing the current network signature with the baseline network signature, which identifies variances in the application's network requests.

Application-requested-input variance: The specific differences or changes detected in the requested inputs by the application when compared to the baseline, such as variations in data types, formats, or new fields being added or removed.

Development phase: The phase in the software development lifecycle where the application is being created, tested, and refined. During this phase, the baseline network signature is generated by monitoring and recording the expected outbound requests and validating them for consistency.

Notification: A system alert or message generated to communicate results of the client-side network test, especially when variances are detected or when no variances are found.

Updated release: A newer version of the application, typically with changes or enhancements to features, that may result in variances in the network requests made by the application compared to previous versions.

Testing outbound network requests: The process of evaluating the network requests made by an application to detect any discrepancies or issues by comparing the real-time requests against a known, validated baseline.

Determining no application-requested-input variances: The process of analyzing the client-side network test result and confirming that the application's network requests are consistent with the baseline network signature, with no differences detected in the application-requested inputs.

Generating a notification indicating no variances: The action of sending a notification or alert to stakeholders to confirm that the current application's network behavior matches the expected behavior (i.e., no changes or deviations were found).

Expected Variances: Variances that occur due to planned, intentional changes or updates in the application, such as new features, version upgrades, or configuration changes that are part of the application's lifecycle. These are considered normal and do not indicate issues.

Unexpected Variances: Variances that occur outside of the expected application behavior. These deviations may suggest bugs, misconfigurations, or unintended changes in the application's network behavior, and often require further investigation.

Customizable Baseline Update: A mechanism that allows the baseline network signature to be periodically adjusted to reflect changes in the application over time. This ensures that the network signature remains aligned with the evolving application.

Periodic Update: Regular intervals at which the baseline network signature is updated, typically triggered by new releases, updates to application-requested inputs, or significant changes in the application's functionality.

Custom Rules: User-defined conditions or criteria that specify what constitutes an acceptable variance in application-requested inputs. These rules provide flexibility in adjusting the sensitivity of variance detection to match the application's expected behavior.

Variance Thresholds: Predefined limits or parameters that specify the degree of change in application-requested inputs that is considered significant enough to trigger an alert or flag it as an anomaly. These thresholds help automate the identification of issues that require attention.

Specified Data Types: The expected types of data (e.g., integer, string, boolean, etc.) that the application-requested inputs should conform to. Specifying the data type ensures that inputs are validated for correctness and compatibility with the application's functionality.

Input Format Constraints: Rules that define the required format for certain application-requested inputs (e.g., date format, numerical range, regex patterns for string inputs). These constraints help ensure that the inputs meet specific structural requirements, preventing errors or unexpected behaviors.

Granular Reporting: The process of generating detailed reports that specify the exact nature of variances in application-requested inputs, such as which parameters changed, the magnitude of the change, and the potential impact on the application's behavior or performance.

Actionable Insights: Information provided to the user that helps identify the cause of the variances and the possible effects of those changes. These insights enable stakeholders to take corrective or preventive actions to address identified issues or improve the application.

With reference now to the drawings, FIG. 1 provides a block diagram illustrating an exemplary system 100 for performing testing using network signature comparison, in accordance with implementations of the present disclosure. It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

The system 100 is an example of a suitable architecture for implementing certain aspects of the present disclosure. Among other components not shown, the system 100 includes a user device 102, an online transaction platform 104, and a network signature comparison system 114. Each of the user device 102, the online transaction platform 104, and the network signature comparison system 114 shown in FIG. 1 can comprise one or more computer devices, such as the computing device 1200 of FIG. 12, discussed below. As shown in FIG. 1, the user device 102, the online transaction platform 104, and the network signature comparison system 114 can communicate via a network 106, which may include, without limitation, one or more local area networks (LANs) and/or wide area networks (WANs). Such networking environments are commonplace in offices, enterprise-wide computer networks, intranets, and the Internet. It should be understood that any number of user devices and servers may be employed within the system 100 within the scope of the present technology. Each may comprise a single device or multiple devices cooperating in a distributed environment. For instance, the online transaction platform 104 and the network signature comparison system 114 could each be provided by multiple server devices collectively providing the functionality of the online transaction platform 104 and the network signature comparison system 114 as described herein. Additionally, other components not shown may also be included within the network environment.

The user device 102 can be a client device on the client-side of operating environment 100, while the online transaction platform 104 and the network signature comparison system 114 can be on the server-side of operating environment 100. The online transaction platform 104 and/or the network signature comparison system 114 can each comprise server-side software designed to work in conjunction with client-side software on the user device 102 so as to implement any combination of the features and functionalities discussed in the present disclosure. For instance, the user device 102 can include an application 108 for interacting with the online transaction platform 104 and/or the network signature comparison system 114. The application 108 can be, for instance, a web browser or a dedicated application for providing functions, such as interacting with the online transaction platform 104 and/or the network signature comparison system 114. This division of operating environment 100 is provided to illustrate one example of a suitable environment, and there is no requirement for each implementation that any combination of the online transaction platform 104 and the network signature comparison system 114 remain as separate entities. For instance, in some aspects, the network signature comparison system 114 is a part of the online transaction platform 104. While the operating environment 100 illustrates a configuration in a networked environment with a separate user device, online transaction platform, and fraud detection system, it should be understood that other configurations can be employed in which aspects of the various components are combined.

The user device 102 may comprise any type of computing device capable of use by a user. For example, in one aspect, a user device may be the type of computing device 1200 described in relation to FIG. 12 herein. By way of example and not limitation, the user device 102 may be embodied as a personal computer (PC), a laptop computer, a mobile or mobile device, a smartphone, a tablet computer, a smart watch, a wearable computer, a personal digital assistant (PDA), an MP3 player, global positioning system (GPS) or device, video player, handheld communications device, gaming device or system, entertainment system, vehicle computer system, embedded system controller, remote control, appliance, consumer electronic device, a workstation, or any combination of these delineated devices, or any other suitable device. A user may be associated with the user device 102 and may interact with the online transaction platform 104 and/or the network signature comparison system 114 via the user device 102.

The online transaction platform 104 can be implemented using one or more server devices, one or more platforms with corresponding application programming interfaces, cloud infrastructure, and the like. The online transaction platform 104 generally comprises any computer-based system that facilitates electronic transactions over the network 106 via user devices, such as the user device 102. In some aspects, the online transaction platform 104 comprises a listing platform (e.g., an e-commerce platform) that generally provides, to the user device 102, item listings describing items (physical or digital) available for purchase, rent, streaming, download, etc., and facilitates electronic purchase transactions for items. In other aspects, the online transaction platform 104 comprises a payment platform that facilitates electronic payment transactions between two accounts. In still further aspects, the online transaction platform 104 comprises a banking platform that facilitates the electronic transfer of money between accounts.

As described in further detail below, the network signature comparison system 114 performs client application testing by comparing requests from the application 108 operating on the user device 102 to a server of an online transaction platform, such as the online transaction platform 104. The components of the network signature comparison system 114 may be in addition to other components that provide further additional functions beyond the features described herein. The network signature comparison system 114 can be implemented using one or more server devices, one or more platforms with corresponding application programming interfaces, cloud infrastructure, and the like. While the network signature comparison system 114 is shown separate from the online transaction platform 104 and the user device 102 in the configuration of FIG. 1, it should be understood that in other configurations, some of the functions of the network signature comparison system 114 can be provided on the online transaction platform 104 and/or the user device.

In some aspects, the functions performed by components of the network signature comparison system 114 are associated with one or more applications, services, or routines. In particular, such applications, services, or routines may operate on one or more user devices, servers, may be distributed across one or more user devices and servers, or be implemented in the cloud. Moreover, in some aspects, these components of the network signature comparison system 114 may be distributed across a network, including one or more servers and client devices, in the cloud, and/or may reside on a user device. Moreover, these components, functions performed by these components, or services carried out by these components may be implemented at appropriate abstraction layer(s) such as the operating system layer, application layer, hardware layer, etc., of the computing system(s). Alternatively, or in addition, the functionality of these components and/or the aspects of the technology described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc. Additionally, although functionality is described herein with regards to specific components shown in example system 100, it is contemplated that in some aspects, functionality of these components can be shared or distributed across other components.

The network signature comparison system 114 performs client application testing by comparing requests (e.g., network requests) generated by the application 108 (e.g., a client application) to a server application of an online transaction platform, such as the online transaction platform 104. The requests generally comprises any information regarding user interaction, via the user device 102, using the application 108, with a server application of the online transaction platform 104. In some configurations, the online transaction platform 104 is a website or web application that provides one or more pages (i.e., user interfaces) that are presented via the user device 102 and allow for user interaction (for a business user).

The network signature comparison system 114 includes a network proxy component 116, a network signature component 118, a workflow component 120, a test process component 122, and a network management component 124. The network proxy component 116, network signature component 118, workflow component 120, test process component 122, and network management component 124 together perform client application testing using network signature comparison using systems and methods described herein. For example, the network proxy component 116, network signature component 118, workflow component 120, test process component 122, and network management component 124 perform client application testing using network signature comparison proceeds by first instantiating a test process that starts an application workflow (e.g., of application 108). The test process component 122 instantiates the test process using a workflow defined by the workflow component 120. This test process uses the network proxy component 116 to create a network proxy 112, which is a process or application that operates between the application 108 and a networking client 110. The networking client 110 is an application or process that receives network requests from the application 108 and sends those requests to a server application of the online transaction platform 104, not shown in FIG. 1. The networking client 110 also receives responses from the server application and sends those responses to the application 108. The network proxy component 116 uses the network proxy 112 to intercept the network requests from the application 108, records the network requests, and forwards the network requests to the server application. In some aspects, the responses to the network requests from the server application are sent directly to the application 108, bypassing the network proxy 112.

The network management component 124 is a component that manages, monitors, and coordinates the process of capturing, analyzing, and comparing the network behaviors (e.g., the network footprint) of client applications such as application 108. The network management component 124 (also referred to herein as a "network management client") can be responsible for initiating and controlling network testing, managing baseline signatures, triggering tests, processing and causing display of the results of comparisons between the generated network signature and a baseline. In some aspects, the network management component 124 uses one or more of the network proxy component 116, the network signature component 118, the workflow component 120, and/or the test process component 122 to coordinate the processes of capturing, analyzing, and comparing the network behaviors (e.g., the network footprint) of client applications such as application 108 and of initiating and controlling network testing, managing baseline signatures, triggering tests, processing and causing display of the results of comparisons between the generated network signature and a baseline.

The network management component 124 can support determining whether client-side network requests conform to expected behaviors, and can help identify discrepancies or deviations that may require further investigation or remediation. The network management component 124 can also initiate the process of capturing network requests from a client application, either on demand or automatically at specific intervals using. In some aspects, the network management component 124 uses one or more of the network proxy component 116, the network signature component 118, the workflow component 120, and/or the test process component 122 to initiate the process of capturing network requests from a client application, either on demand or automatically at specific intervals using. The network management component 124 can also create baseline network signatures based on expected application behaviors and update those baseline network signatures as the application 108 evolves over time.

The network management component 124 can also compare the network signature from a new test against the stored baseline to identify any variances in network requests using one or more of the network proxy component 116, the network signature component 118, the workflow component 120, and/or the test process component 122, as described herein. The network management component 124 can also access the results of the network signature comparison (e.g., using the network signature component 118) to support processing variances that may indicate issues such as performance problems or misconfigurations. The network management component 124 can serve as the central interface for managing the entire testing and monitoring process described herein, providing insights and control over client-side network behaviors.

In some aspects, the recorded network requests are then used to generate a network signature for the client application, using the network signature component 118, where the network signature includes the aforementioned network request data as well as metadata associated with those network requests. When a new network test is fabricated (e.g., by the test process component 122), a new network signature is stored in a datastore 126 by the test process component 122 using the network signature component 118. This new network signature can be used as a baseline network signature for the application 108. When subsequent network tests of the application 108 are performed, a new network signature is generated that can be compared to the baseline network signature. If the new network signature is the same as the baseline network signature, the network test of the application 108 is successful and, in some aspects, the test process component 122 reports this success. If the new network signature is not the same as the baseline network signature, the network test of the application 108 fails and, in some aspects, the test process component 122 reports this failure. This failure can indicate that behavior of the application 108 has changed for the specified workload. This failure can be used to identify errors in the application 108 or can identify new baseline behavior for the application 108. For example, when the change to the application 108 is intentional (e.g., due to new development), the new network signature can be stored in the datastore 126 as a new baseline network signature by the network signature component, providing a new metric for correct behavior of the application 108.

Figure 2:
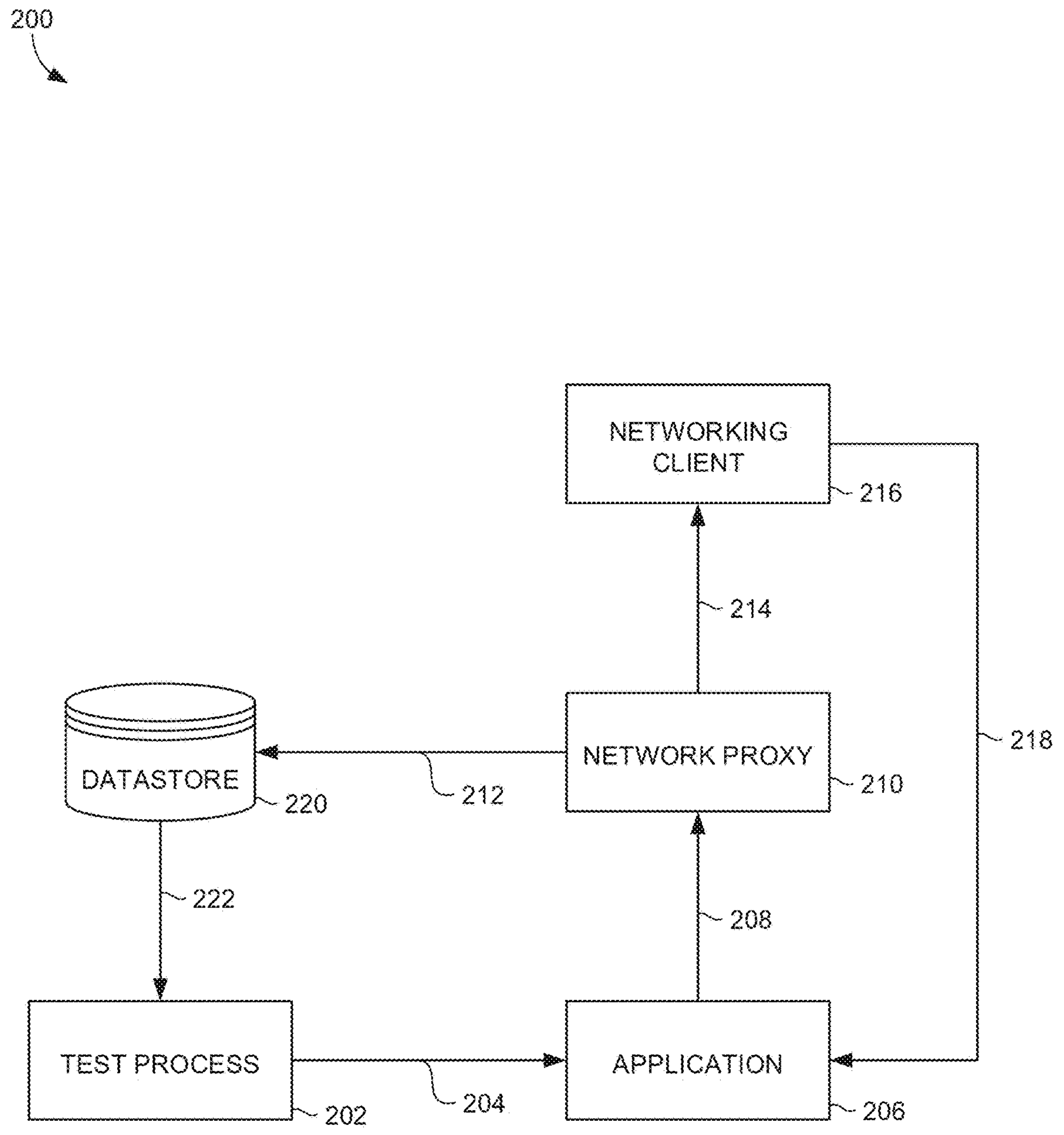
FIG. 2 provides a block diagram illustrating data flow of a system for performing testing using network signature comparison, in accordance with some implementations of the present disclosure.

FIG. 2 provides a block diagram 200 illustrating data flow of a system for performing testing using network signature comparison, in accordance with some implementations of the present disclosure. In some aspects, a test process 202 is instantiated that configures a networking client 216 with a network proxy 210. The test process 202 can be instantiated by a test process component such as test process component 122 of FIG. 1. The networking client 216 is a networking client such as networking client 110 of FIG. 1. The network proxy 210 is a network proxy such as network proxy 112 of FIG. 1. The network proxy 210 can be instantiated using a network proxy component such as network proxy component 116 of FIG. 1.

In some aspects, the test process 202 can invoke 204 an application workflow of an application 206, using a workflow component such as workflow component 120 of FIG. 1. The test process 202 can invoke 204 an application workflow which may be a workflow to perform a task to create an item listing or a workflow to perform a task to update an item listing in an online transaction platform such as online transaction platform 104 of FIG. 1.

As part of the workflow, the application 206 can issue requests 208 that are received by the network proxy 210. For example, when performing a task to create a new item listing in an online transaction platform, the application 206 can issue requests 208 such as those requests described in connection with FIG. 4 of a workflow to navigate to a search page 402, enter a search term 406, display options 410, and/or select an option 422. Similarly, when performing a task to update an item listing in an online transaction platform, the application 206 can issue requests 208 such as those requests described in connection with FIG. 6 of a workflow to navigate to a search page 602, enter a search term 606, display options 610, and/or select an option 622.

In some aspects, the network proxy 210 records network signatures 212 of the requests of the workflow in the datastore 220, which is a datastore such as datastore 126 of FIG. 1. In some aspects, the network proxy 210 passes the requests 214 of the workflow to the networking client 216 and the networking client 216 sends the requests of the workflow to a server application (not shown in FIG. 2), as described herein. When the networking client 216 receives responses from the server application, the networking client 216 sends those responses 218 to the application 206. In some aspects, not shown in FIG. 2, the networking client 216 sends responses from the server application to the application 206 using the network proxy 210.

In some aspects, the test process 202 downloads 222 the network signatures of the requests from the datastore 220 and compiles those network signatures into a network signature as described herein in connection with FIGS. 4-7. In some aspects, not shown in FIG. 2, during test fabrication (e.g., during the creation of a new client test using network signature comparison), the test process 202 stores the compiled network signature in the datastore 220 as a baseline network signature. In some aspects, also not shown in FIG. 2, during subsequent client tests, the test process 202 retrieves the baseline network signature from the datastore 220 and compares the current compiled network signature to the baseline network signature. As described herein, when the current compiled network signature and the baseline network signature are the same, the test succeeds. Conversely, when the current compiled network signature and the baseline network signature are not the same, the test fails. In some aspects, the current compiled network signature (e.g., from the present test) can be stored in the datastore 220 as a new baseline network signature.

Figure 3:
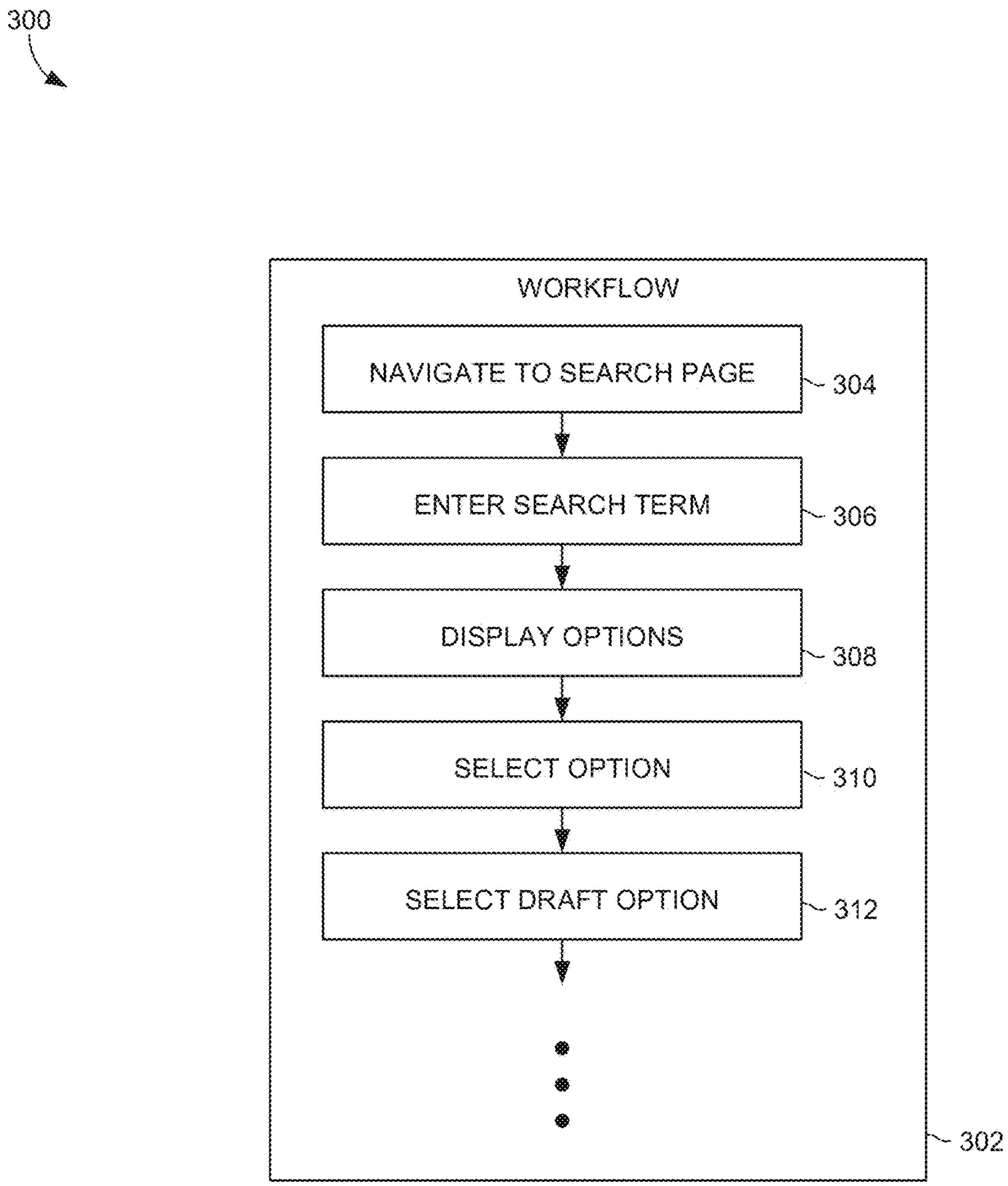
FIG. 3 provides a block diagram illustrating an example workflow used for testing using network signature comparison, in accordance with some implementations of the present disclosure.

FIG. 3 provides a block diagram 300 illustrating an example workflow used for testing using network signature comparison, in accordance with some implementations of the present disclosure. The example workflow 302 illustrated in FIG. 3 includes tasks to navigate to a search page 304, enter a search term 306, display options 308, select an option 310, and select a draft option 312 from the displayed options. The example workflow illustrated in FIG. 3 is to select options for a sneaker size, so select draft option 312 is to select a size of sneakers, as described in FIGS. 4-7. Further details of these tasks and how they are used to generate requests and how those tasks are compiled into a network signature are provided in FIGS. 4-7. The workflow 302 illustrated in FIG. 3 can be used to create a new item listing and can also be used to update an item listing, as described herein. This workflow, while appearing to be the workflow of a task performed by a consumer, is a workflow used to test a client using network signature comparison so, for example, the tasks to navigate to a search page 304, enter a search term 306, display options 308, select an option 310, and select a draft option 312 from the displayed options can be performed by components of a network footprint comparison system 114 of FIG. 1.

Figure 4:
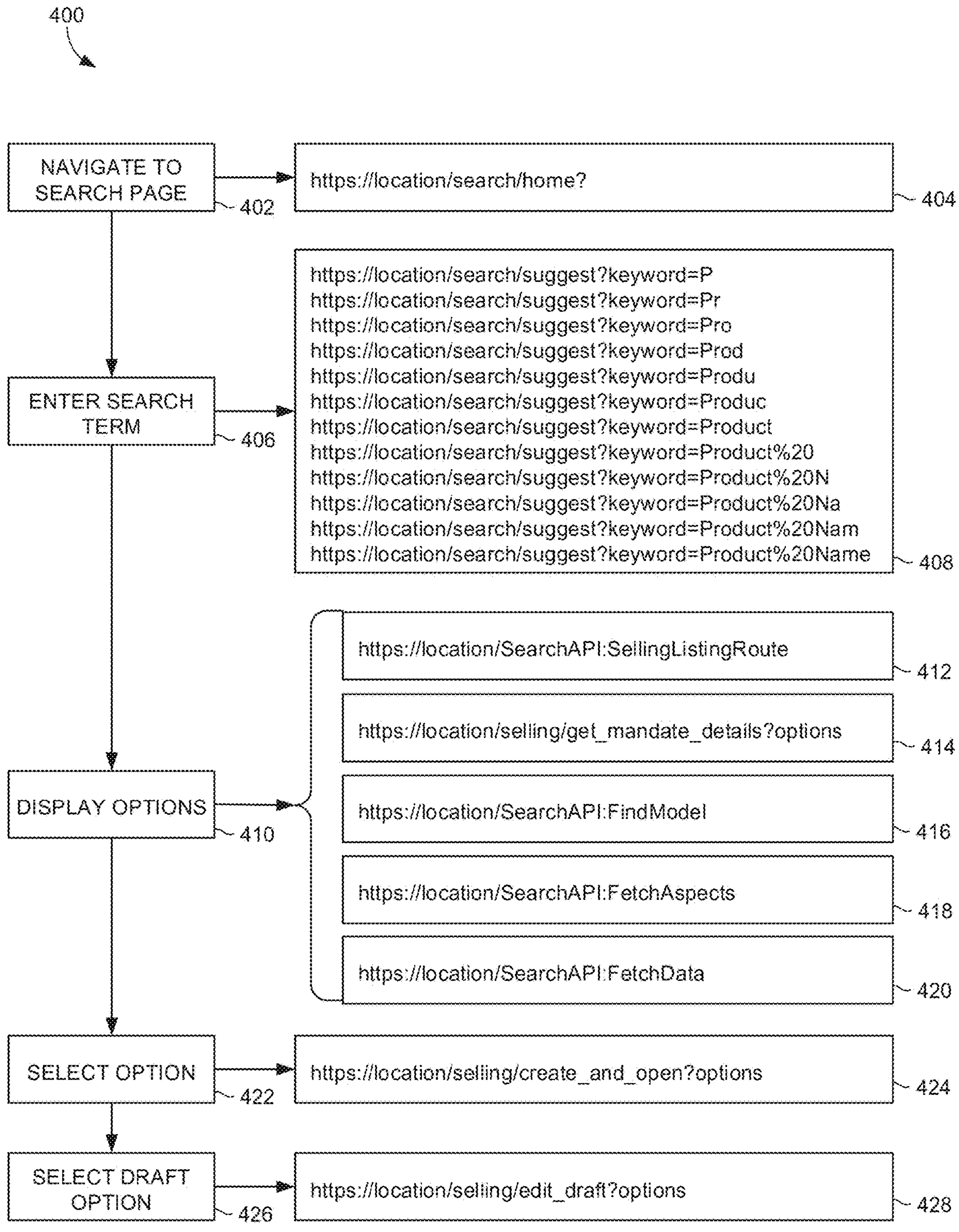
FIG. 4 provides a block diagram illustrating networking requests of a workflow to update an item listing, in accordance with some implementations of the present disclosure FIG. 5 provides a block diagram illustrating an example network signature of a workflow to update an item listing, in accordance with some implementations of the present disclosure.

FIG. 4 provides a block diagram 400 illustrating networking requests of a workflow to update an item listing, in accordance with some implementations of the present disclosure. The workflow to create an item listing illustrated in FIG. 4 includes tasks to navigate to a search page 402, enter a search term 406, display options 410, select an option 422, and select a draft option 426 (e.g., for shoe size). The workflow to create an item listing illustrated in FIG. 4 is the same as the workflow 302 of FIG. 3. As illustrated in FIG. 4, the task to navigate to a search page 402 causes a network request 404 to be generated that comprises a uniform resource indicator (URI). As described herein, the focus of the testing of the client application using network signature comparison is to ensure that the correct requests are made and in the correct order (e.g., if the requests are order dependent) rather than testing whether the server application sends correct responses to the requests. This testing can be used to identify incorrect requests, redundant requests, and other such request errors, as described herein.

As illustrated in FIG. 4, the task to enter a search term 406 causes twelve network requests 408 to be generated, each of which comprising a URI. In some aspects, a task such as a task to enter a search term 406 causes one network request (e.g., of the twelve network requests 408) to be generated for each character of the search term so, in this example, the search term is "Product Name" which has twelve characters. Each character entered causes a new network request to be generated (e.g., "P", "Pr", "Pro", etc.). This ensures that exactly one request is generated for each character when, for example, predictive text is filled in by the server. As described below in connection with FIG. 5, these twelve network requests 408 are compiled into a network signature and this network signature can be used to ensure that exactly one request is generated for each character entered. This would, for example, identify cases where a client sent multiple requests for each letter (e.g., "P", "P", "Pr", "Pr", "Pro", "Pro", etc.) or where a client sent a different number of requests for each letter (e.g., "P", P", "Pr", "Pr", "Pr", "Pro", "Prod", "Prod", "Prod", "Prod", etc.) or where a client sent requests for only some letters (e.g., "P", "Pro", "Produc", etc.). The twelve network requests 408 ensure that exactly twelve requests are sent for the twelve letters and, any other set of requests may cause a test failure.

The task to display options 410 causes several network requests to be generated including requests to perform application programming interface (API) calls as well as requests that comprise URIs. The task to display options 410 includes a request to perform a seller listing API 412, a request to get details 414 comprising a URI, a request to perform a find model API 416, a request to perform a fetch aspects API 418, and a request to perform a fetch data API 420. In some aspects, these requests are to be performed synchronously (e.g., in the order specified). In some aspects, these requests can be performed asynchronously (e.g., can be performed in any order). In some aspects, an indication of whether the request is to be performed synchronously or asynchronously is indicated by data and/or metadata associated with the request. When the requests can be performed asynchronously, the order of the tasks (e.g., tasks 412-420) can vary so that, for example, task 414 can be performed at any time after task 412, task 416, task 418, etc. In some aspects, not shown in FIG. 4, other data and/or metadata can be associated with the request including, but not limited to, time when the request was sent, length of time to receive a response, optional arguments to the request, whether the request is required or optional, etc.).

The task to select an option 422 causes a network request 424 to be generated that comprises a URI to create and open an entry (e.g., a new listing) in the item listing service. The task to select a draft option 426 (e.g., to select from displayed options) causes a network request 428 to be generated that comprises a URI to edit an existing entry. The URI of the network request 428 to edit an existing entry is different than the URI of the network request 424 to create an entry. The task to display options 410 and the associated requests (e.g., the request to perform a seller listing API 412, the request to get details 414 comprising a URI, the request to perform a find model API 416, the request to perform a fetch aspects API 418, and the request to perform a fetch data API 420), the task to select an option 422 that causes a network request 424 to be generated, and the task to select a draft option 426 that causes a network request 428 to be generated are described in more detail below.

FIG. 5 provides a block diagram illustrating an example network signature 500 of a workflow to update an item listing, in accordance with some implementations of the present disclosure. The example network signature 500 illustrated in FIG. 5 comprises each of the requests of FIG. 4 that are compiled as service requests (e.g., for the URI requests) or API requests (e.g., for the API requests). The example network signature 500 can be compared to a baseline network signature, as described herein, to identify changes in client application behavior. When this network signature 500 is different than the baseline network signature, this can be an indication that the client behavior has changed. When this network signature 500 is the same as the baseline network signature, this can be an indication that the client behavior has not changed. This comparison is described in more detail in FIGS. 8 and 9.

Figure 6:
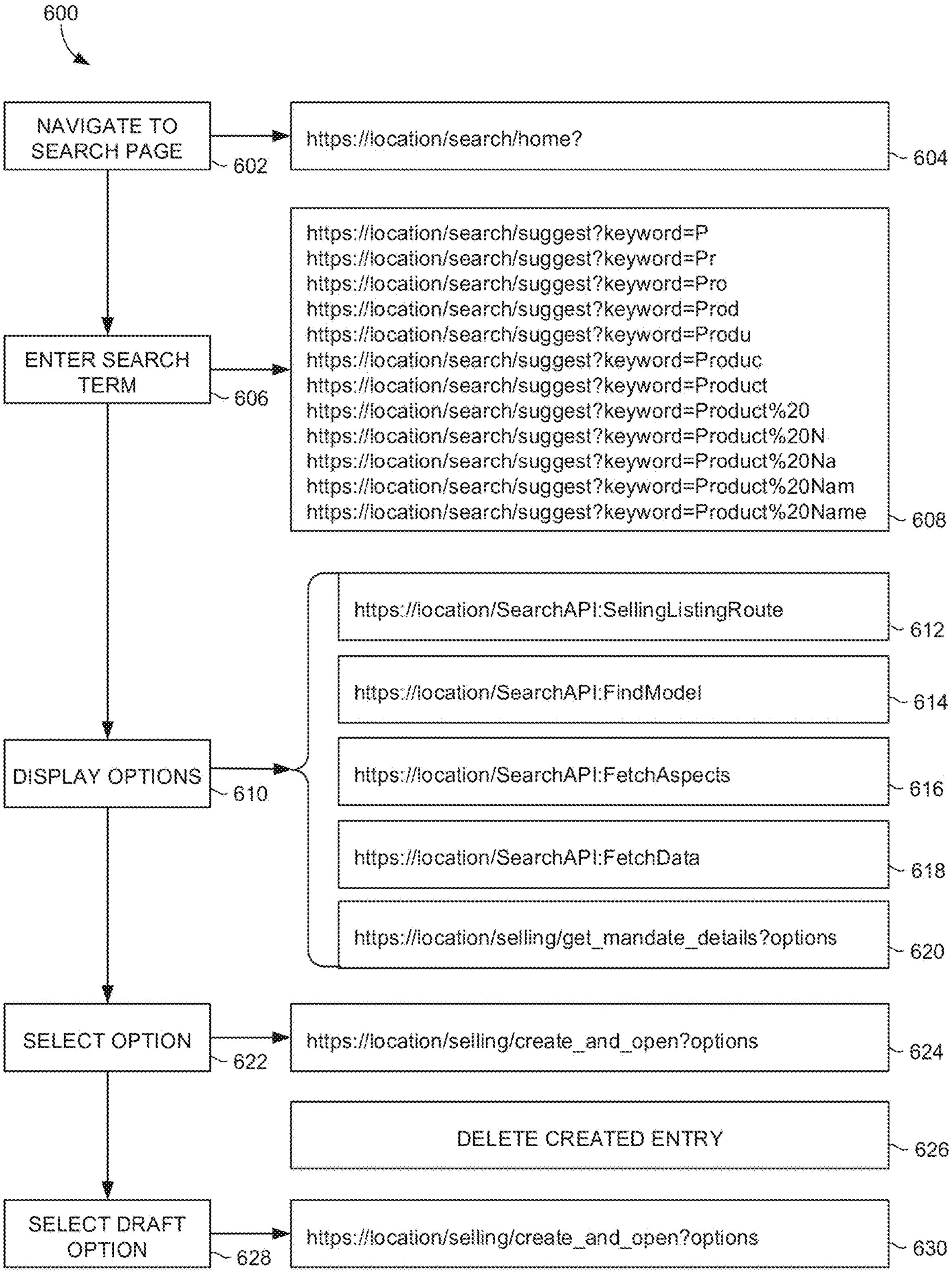
FIG. 6 provides a block diagram illustrating networking requests of a workflow to update an item listing where a creation operation has failed, in accordance with some implementations of the present disclosure FIG. 7 provides a block diagram illustrating an example network signature of a workflow to update an item listing where a creation operation has failed, in accordance with some implementations of the present disclosure.

FIG. 6 provides a block diagram 600 illustrating networking requests of a workflow to update an item listing where a task to create the item listing fails, in accordance with some implementations of the present disclosure. The workflow to update an item listing where a task to create the item list fails illustrated in FIG. 6 includes tasks to navigate to a search page 602, enter a search term 606, display options 610, select an option 622, and select a draft option 628. The workflow to create an item listing illustrated in FIG. 6 is the same as the workflow 302 of FIG. 3. As illustrated in FIG. 6, the task to navigate to a search page 602 causes a network request 604 to be generated that comprises a uniform resource indicator (URI) and the task to enter a search term 606 causes twelve network requests 608 to be generated, each of which comprising a URI. These tasks (e.g., 602 and 606) are the same as the tasks 402 and 406 of FIG. 4, and the requests 604 and 608 are also the same as requests 404 and 408.

As illustrated in FIG. 6, the task to display options 610 also causes several network requests to be generated including requests to perform application programming interface (API) calls as well as requests that comprise URIs. However, in FIG. 6, the task to display options 610 causes the network requests to be generated in a different order than that displayed in FIG. 4 for the task to display options 410. This is to illustrate the asynchronous nature of these tasks. In FIG. 6, the task to display options 610 includes a request to perform a seller listing API 612, a request to perform a find model API 614, a request to perform a fetch aspects API 616, a request to perform a fetch data API 618, and a request to get details 620 comprising a URI. This order (e.g., of request 614 and request 620) differ from the order of the requests of FIG. 4.

The task to select an option 622 causes a network request 624 to be generated that comprises a URI to create an entry and open a new entry (e.g., a new listing) in the item listing service. The workflow here includes an additional task to delete the created entry 626. Deleting the created entry simulates a server failure (e.g., that the network request 624 was sent, but not completed). This simulated failure can be used to test client behavior in a number of ways. For example, the client would be responding correctly when the simulated failure is followed by a new request to create and open the new entry, as is illustrated in FIG. 6. Accordingly, the task to select a draft option 628 (e.g., to select from displayed options) causes a network request 630 to be generated that comprises another URI to create and open a new entry rather than a URI to edit an existing entry, as was described in connection with FIGS. 4 and 5. Here, the URI of the network request 630 to create and open a new entry is identical to the URI of the network request 624

The task to display options 610 and its associated requests (e.g., the request to perform a seller listing API 612, the request to perform a find model API 614, the request to perform a fetch aspects API 616, the request to perform a fetch data API 618, and the request to get details 620 comprising a URI), the task to select an option 622 that causes a network request 624 to be generated, and the task to select a draft option 628 that causes a network request 630 to be generated are described in more detail below.

FIG. 7 provides a block diagram illustrating an example network signature 700 for a workflow to update an item listing where a task to create the item listing fails, in accordance with some implementations of the present disclosure. The example network signature 700 illustrated in FIG. 7 comprises each of the requests of FIG. 6 that are compiled as service requests (e.g., for the URI requests) or API requests (e.g., for the API requests). The example network signature 700 can be compared to a baseline network signature, as described herein, to identify changes in client application behavior. When this network signature 700 is different than the baseline network signature, this can be an indication that the client behavior has changed. When this network signature 700 is the same as the baseline network signature, this can be an indication that the client behavior has not changed. This comparison is described in more detail in FIGS. 8 and 9.

Figure 8:
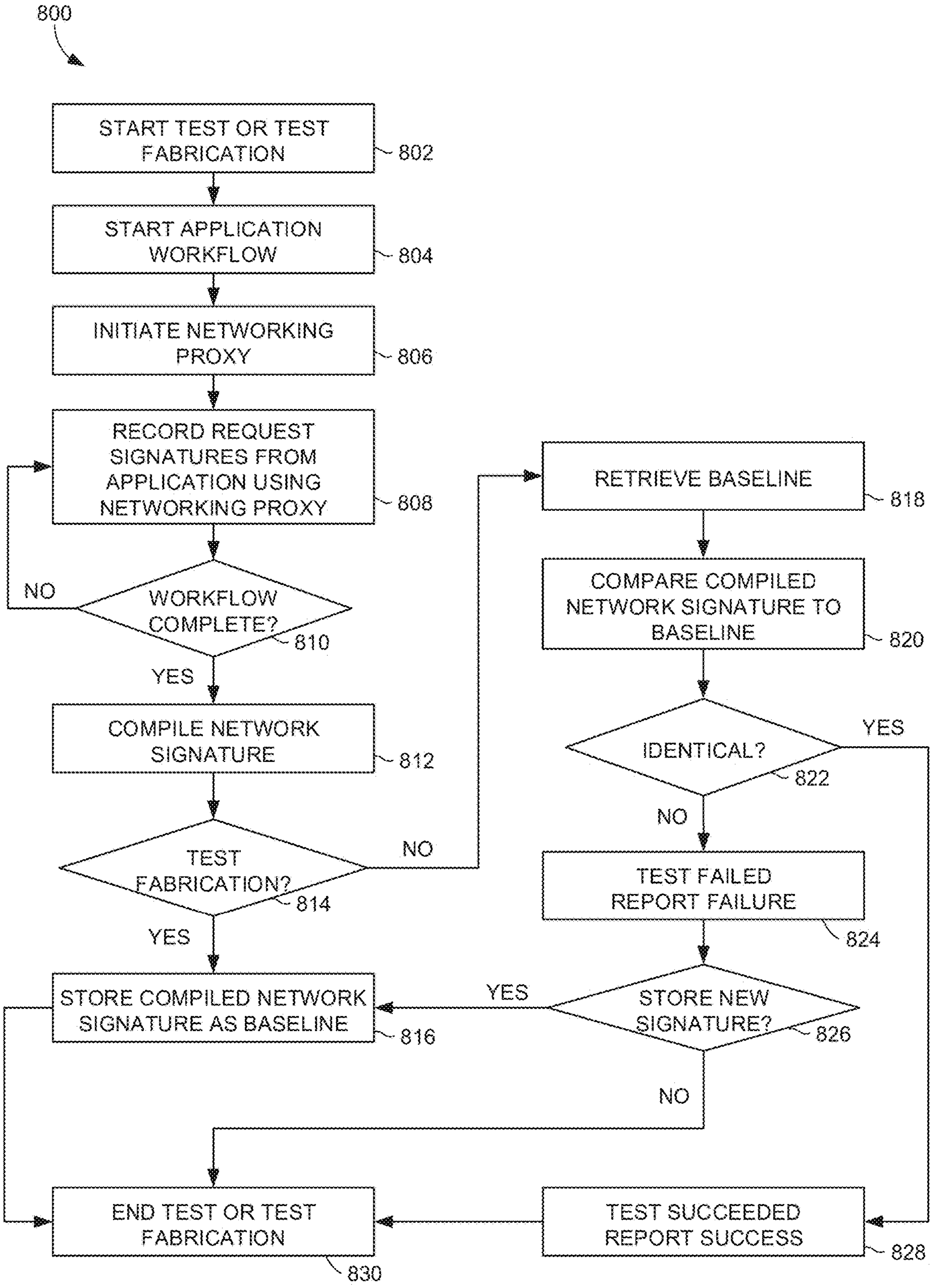
FIG. 8 provides a flow diagram illustrating a method for performing client testing using network signature comparison, in accordance with some implementations of the present disclosure.

FIG. 8 provides a flow diagram illustrating a method 800 for performing client testing using network signature comparison, in accordance with some implementations of the present disclosure. The method 800 can be performed by the network signature comparison system 114 of FIG. 1. Each block of the method 800 and any other methods described herein comprises a computing process performed using any combination of hardware, firmware, and/or software. For instance, various functions can be carried out by a processor such as one or more of processor(s) 1214, executing instructions stored in memory such as memory 1212, both described in connection with FIG. 12. The methods can also be embodied as computer-usable instructions stored on computer storage media. The methods can be provided by a standalone application, a service or hosted service (standalone or in combination with another hosted service), or a plug-in to another product, to name a few.

At block 802, a processor performing method 800 performs operations to start a test or start a test fabrication. As used herein, a test fabrication comprises the creation of a new test and the associated new test may not have an existing baseline network signature. As such, a test fabrication may not execute block 818 to block 828 of method 800. Conversely, a test may have an existing baseline network signature and would execute block 818 to block 828 of method 800. Operations of block 802 to start a test or start a test fabrication can be performed by a test process such as test process 202 of FIG. 2. Operations of block 802 to start a test or start a test fabrication can also be performed by a test process component such as test process component 122 of FIG. 1. In some aspects, after block 802, method 800 continues at block 804.

At block 804, a processor performing method 800 performs operations to start an application workflow (e.g., to invoke 204 an application workflow of an application 206, as described in connection with FIG. 2). Operations of block 804 to start an application workflow can be performed by a test process such as test process 202 of FIG. 2. Operations of block 804 to start an application workflow can also be performed by a test process component such as test process component 122 of FIG. 1. Operations of block 804 to start an application workflow can also be performed by a workflow component such as workflow component 120 of FIG. 1. In some aspects, after block 804, method 800 continues at block 806.

At block 806, a processor performing method 800 performs operations to initiate a networking proxy (e.g., a test process 202 that is instantiated configures a networking client 214 with a network proxy 210, as described in connection with FIG. 2). Operations of block 806 to initiate a networking proxy can be performed by a test process such as test process 202 of FIG. 2. Operations of block 806 to initiate a networking proxy can also be performed by a test process component such as test process component 122 of FIG. 1. Operations of block 806 to initiate a networking proxy can also be performed by a network proxy component such as network proxy component 116 of FIG. 1. In some aspects, after block 806, method 800 continues at block 808.

At block 808, a processor performing method 800 performs operations to record request signatures generated by the client application (e.g., using the application workflow started at block 804) using the networking proxy (e.g., initiated at block 806). Operations of block 808 to record request signatures generated by the client application using the networking proxy can be performed by a network proxy such as network proxy 210 of FIG. 2. Operations of block 808 to record request signatures generated by the client application using the networking proxy can also be performed by a network signature component such as network signature component 118 of FIG. 1. Operations of block 808 to record request signatures generated by the client application using the networking proxy can also be performed by a network proxy component such as network proxy component 116 of FIG. 1. In some aspects, after block 808, method 800 continues at block 810.

At block 810, a processor performing method 800 performs operations to determine whether the workflow started at block 804 is complete. In some aspects, a workflow is complete when all tasks have completed. In some aspects, a workflow is complete when some error condition occurs. In some aspects, at block 810, if it is determined that the workflow started at block 804 is complete ("YES" branch), method 800 continues at block 812. In some aspects, at block 810, if it is determined that the workflow started at block 804 is not complete ("NO" branch), method 800 continues at block 808, to record request signatures generated by the client application using the networking proxy, as described above. Operations of block 810 to determine whether the workflow started at block 804 is complete can be performed by a test process such as test process 202 of FIG. 2. Operations of block 810 to determine whether the workflow started at block 804 is complete can also be performed by a test process component such as test process component 122 of FIG. 1.

At block 812, a processor performing method 800 performs operations to compile a network signature from the recorded request signatures (e.g., recorded during iterations of block 808) as described herein at least in connection with FIGS. 4-7. In some aspects, operations of block 812 are performed only after the workflow started at block 804 is complete (e.g., after the "YES" branch of block 810). In some aspects, not shown in FIG. 8, operations of block 812 are performed concurrently or in parallel with iterations of block 808 so that, for each network request signature recorded, a network signature is updated with that request. Operations of block 812 to compile a network signature from the recorded request signatures can be performed by a network proxy such as network proxy 210 of FIG. 2. Operations of block 812 to compile a network signature from the recorded request signatures can also be performed by a network signature component such as network signature component 118 of FIG. 1. Operations of block 812 to compile a network signature from the recorded request signatures can also be performed by a network proxy component such as network proxy component 116 of FIG. 1. In some aspects, after block 812, method 800 continues at block 814.

At block 814, a processor performing method 800 performs operations to determine whether a test fabrication was started at block 802. As described above, a test fabrication is the creation of a new test that may not have a baseline network signature that can be used for comparison. In some aspects, at block 814, if it is determined that a test fabrication was started at block 802 ("YES" branch), method 800 continues at block 816. In some aspects, at block 814, if it is determined that that a test was started at block 802 and thus, that a test fabrication was not started at block 802 ("NO" branch), method 800 continues at block 818. Operations of block 814 to determine whether a test fabrication was started at block 802 can be performed by a test process such as test process 202 of FIG. 2. Operations of block 814 to determine whether a test fabrication was started at block 802 can also be performed by a test process component such as test process component 122 of FIG. 1.

At block 816, a processor performing method 800 performs operations to store the compiled network signature (e.g., compiled at block 812) in a datastore such as datastore 126 of FIG. 1. Operations of block 816 to store the compiled network signature in a datastore can be performed by a network proxy such as network proxy 210 of FIG. 2. Operations of block 816 to store the compiled network signature in a datastore can also be performed by a network signature component such as network signature component 118 of FIG. 1. Operations of block 816 to store the compiled network signature in a datastore can also be performed by a network proxy component such as network proxy component 116 of FIG. 1. In some aspects, after block 816, method 800 continues at block 830.

At block 818, a processor performing method 800 performs operations to retrieve a baseline network signature from a datastore such as datastore 126 of FIG. 1. In some aspects, where a baseline network signature cannot be obtained from a datastore, a blank or empty baseline network signature can be created at block 818. In some aspects, not shown in FIG. 8, where a baseline network signature cannot be obtained from a datastore, an error can be generated and method 800 may terminate. Operations of block 818 to retrieve a baseline network signature from a datastore can be performed by a test process such as test process 202 of FIG. 2. Operations of block 818 to retrieve a baseline network signature from a datastore can also be performed by a network signature component such as network signature component 118 of FIG. 1. Operations of block 818 to retrieve a baseline network signature from a datastore can also be performed by a test process component such as test process component 122 of FIG. 1. In some aspects, after block 818, method 800 continues at block 820.

At block 820, a processor performing method 800 performs operations to compare the compiled network signature (e.g., compiled at block 812) to the baseline network signature (e.g., retrieved at block 818). In some aspects, the operations of block 820 to compare the compiled network signature to the baseline network signature are to perform a comparison to determine whether the two network signatures are identical. In some aspects, the operations of block 820 to compare the compiled network signature to the baseline network signature are perform a comparison to determine whether the two network signatures are substantially the same (e.g., identical to within a certain threshold). In some aspects, the operations of block 820 to compare the compiled network signature to the baseline network signature are to perform a modular comparison where, for example, a first portion of a compiled network signature is compared to a first baseline network signature, a second portion of a compiled network signature is compared to a second baseline network signature, and so on. Operations of block 820 to compare the compiled network signature to the baseline network signature can be performed by a test process such as test process 202 of FIG. 2. Operations of block 820 to compare the compiled network signature to the baseline network signature can also be performed by a network signature component such as network signature component 118 of FIG. 1. Operations of block 820 to compare the compiled network signature to the baseline network signature can also be performed by a test process component such as test process component 122 of FIG. 1. In some aspects, after block 820, method 800 continues at block 822.

At block 822, a processor performing method 800 performs operations to determine whether the compiled network signature (e.g., compiled at block 812) and the baseline network signature (e.g., retrieved at block 818) are identical based on the comparison performed at block 820. In some aspects, at block 822, if it is determined that the compiled network signature and the baseline network signature are identical based on the comparison performed at block 820 ("YES" branch), method 800 continues at block 828. In some aspects, at block 822, if it is determined that if it is determined that the compiled network signature and the baseline network signature are not identical based on the comparison performed at block 820 ("NO" branch), method 800 continues at block 824. Operations of block 822 to determine whether the compiled network signature and the baseline network signature are identical based on the comparison performed at block 820 can be performed by a test process such as test process 202 of FIG. 2. Operations of block 822 to determine whether the compiled network signature and the baseline network signature are identical based on the comparison performed at block 820 can also be performed by a test process component such as test process component 122 of FIG. 1.

At block 824, a processor performing method 800 performs operations to indicate that the test (e.g., started at block 802) has failed and to report that failure. In some aspects, the failure is reported by storing the result in a datastore such as datastore 126 of FIG. 1. In some aspects, the failure is reported using a user interface such as those described herein. In some aspects, the failure is reported using a dashboard that may be viewed, via a web browser, by users of an online transaction platform such as online transaction platform 104 of FIG. 1. In some aspects, the failure is reported using a combination of these and other such methods. Operations of block 824 to indicate that the test has failed and to report that failure can be performed by a test process such as test process 202 of FIG. 2. Operations of block 824 to indicate that the test has failed and to report that failure can also be performed by a test process component such as test process component 122 of FIG. 1. In some aspects, after block 824, method 800 continues at block 826.

At block 826, a processor performing method 800 performs operations to determine whether to store the compiled network signature (e.g., compiled at block 812) as a new baseline network signature for the test started at block 802. In some aspects, the determination of whether to store the compiled network signature as a new baseline network signature is made based, at least in part, on a determination or indication that the compiled network signature is an improvement over the existing baseline network signature. The compiled network signature may be an improvement of the existing baseline network signature when some new development of the client application has been implemented that intentionally changes the behavior of the client application. In some aspects, at block 826, if it is determined that the compiled network signature is to be stored as a new baseline network signature ("YES" branch), method 800 continues at block 816 to store the compiled network signature as a new baseline signature, as described above. In some aspects, at block 826, if it is determined that if it is determined that the compiled network signature is not to be stored as a new baseline network signature ("NO" branch), method 800 continues at block 830. Operations of block 826 to determine whether to store the compiled network signature as a new baseline network signature for the test started at block 802 can be performed by a test process such as test process 202 of FIG. 2. Operations of block 826 to determine whether to store the compiled network signature as a new baseline network signature for the test started at block 802 can also be performed by a test process component such as test process component 122 of FIG. 1.

At block 828, a processor performing method 800 performs operations to indicate that the test (e.g., started at block 802) has succeeded and to report that success. In some aspects, the success is reported by storing the result in a datastore such as datastore 126 of FIG. 1. In some aspects, the success is reported using a user interface such as those described herein. In some aspects, the success is reported using a dashboard that may be viewed, via a web browser, by users of an online transaction platform such as online transaction platform 104 of FIG. 1. In some aspects, the success is reported using a combination of these and other such methods. Operations of block 828 to indicate that the test has succeeded and to report that success can be performed by a test process such as test process 202 of FIG. 2. Operations of block 828 to indicate that the test has succeeded and to report that success can also be performed by a test process component such as test process component 122 of FIG. 1. In some aspects, after block 824, method 800 continues at block 826.

At block 830, a processor performing method 800 performs operations to end the test or test fabrication started at block 802. In some aspects, operations to end the test or test fabrication started at block 802 include operations to report results, store data and/or metadata in a datastore such as datastore 126, terminate or otherwise tear down a testing environment, etc. In some aspects, after block 830, method 800 terminates. In some aspects, not shown in FIG. 8, after block 830, method 800 continues at block 802, to start a new test or test fabrication as described above.

Although not illustrated in FIG. 8, in some configurations, the operations of the method 800 are performed in a different order than that described. In some configurations, where operations can be performed in a different order, some of the operations can be performed in parallel by a plurality of devices such as those described herein. For example, a plurality of blocks of method 800 can be performed sequentially or in parallel by a plurality of threads executing on devices such as those described herein. As may be contemplated, other orders in which the operations of method 800 may be considered as within the scope of the present disclosure.

Figure 9:
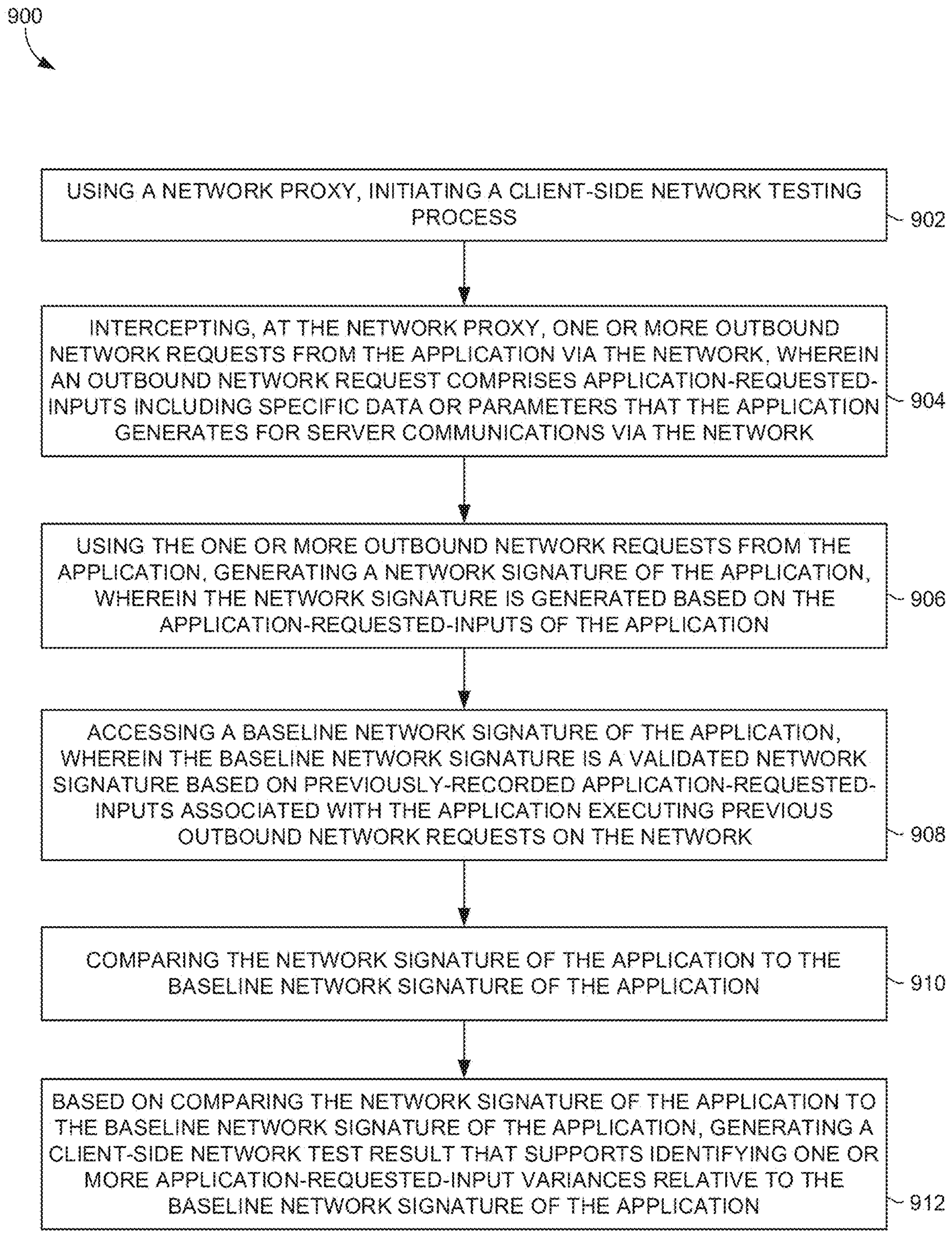
FIG. 9 provides a flow diagram illustrating a method for performing testing using network signature comparison, in accordance with some implementations of the present disclosure.

With reference now to FIG. 9, a flow diagram is provided that illustrates a method 900 for performing testing using network signature comparison, in accordance with some implementations of the present disclosure. The method 900 can be performed by the network signature comparison system 114 of FIG. 1. Each block of the method 900 and any other methods described herein comprises a computing process performed using any combination of hardware, firmware, and/or software. For instance, various functions can be carried out by a processor such as one or more of processor(s) 1214, executing instructions stored in memory such as memory 1212, both described in connection with FIG. 12. The methods can also be embodied as computer-usable instructions stored on computer storage media. The methods can be provided by a standalone application, a service or hosted service (standalone or in combination with another hosted service), or a plug-in to another product, to name a few.

At block 902, a processor performing method 900 performs operations to initiate a client-side network testing process, as described herein. In some aspects, at block 902, a processor performing method 900 performs operations to initiate a client-side network testing process using a network proxy such as network proxy 210 of FIG. 2. In some aspects, the operations to initiate a client-side network testing process of block 902 include one or more operations of block 802, block 804, and/or block 806 of FIG. 8. In some aspects, after block 902, method 900 continues at block 904.

At block 904, a processor performing method 900 performs operations to intercept one or more outbound network requests from the application via the network. In some aspects, at block 904, a processor performing method 900 performs operations to intercept one or more outbound network requests from the application via the network using a network proxy such as network proxy 210 of FIG. 2. In some aspects, the outbound network request comprises application-requested-inputs that include specific data that the application generates for server communications via the network. In some aspects, the specific data includes parameters that the application generates related to server communications via the network. In some aspects, the operations to intercept one or more outbound network requests from the application via the network of block 904 include one or more operations of block 808 and block 810 of FIG. 8. In some aspects, after block 904, method 900 continues at block 906.

At block 906, a processor performing method 900 performs operations to generate a network signature of the application. In some aspects, at block 906, the network signature is generated using the one or more outbound network requests from the application. In some aspects, at block 906, the network signature is generated based on the application-requested-inputs of the application. In some aspects, the operations to generate a network signature of block 906 include one or more operations of block 812 of FIG. 8. In some aspects, after block 906, method 900 continues at block 908.

At block 908, a processor performing method 900 performs operations to access a baseline network signature of the application. In some aspects, at block 908, the baseline network signature is a validated network signature that is based on previously-recorded application-requested-inputs associated with the application executing previous outbound network requests via the network. In some aspects, the operations to access a baseline network signature of the application include one or more operations of block 818 of FIG. 8. In some aspects, after block 908, method 900 continues at block 910.

At block 910, a processor performing method 900 performs operations to compare the network signature of the application to the baseline network signature of the application. In some aspects, at block 910, comparing the network signature comprises identifying variances in application-requested-inputs associated with the one or more outbound network requests. In some aspects, the operations to compare the network signature of the application to the baseline network signature of the application of block 910 include one or more operations of block 820 of FIG. 8. In some aspects, after block 910, method 900 continues at block 912.

At block 912, a processor performing method 900 performs operations to generate a client-side network test result that supports identifying one or more application-requested-input variances relative to the baseline network signature of the application. In some aspects, at block 912, the client-side network test result is based on comparing the network signature of the application to the baseline network signature of the application, performed at block 910. In some aspects, the operations to generate a client-side network test result that supports identifying one or more application-requested-input variances relative to the baseline network signature of the application of block 912 include one or more operations of block 822, block 824, block 826, block 828, and/or block 830 of FIG. 8. In some aspects, after block 912, method 900 terminates. In some aspects, not shown in FIG. 9, after block 912, method 900 continues at block 902, to initiate a client-side network testing process, as described above.

Although not illustrated in FIG. 9, in some configurations, the operations of the method 900 are performed in a different order than that described. In some configurations, where operations can be performed in a different order, some of the operations can be performed in parallel by a plurality of devices such as those described herein. For example, a plurality of blocks of method 900 can be performed sequentially or in parallel by a plurality of threads executing on devices such as those described herein. As may be contemplated, other orders in which the operations of method 900 may be considered as within the scope of the present disclosure.

ADDITIONAL SUPPORT FOR DETAILED DESCRIPTION OF THE INVENTION

Example Item Listing System Environment

Figure 10:
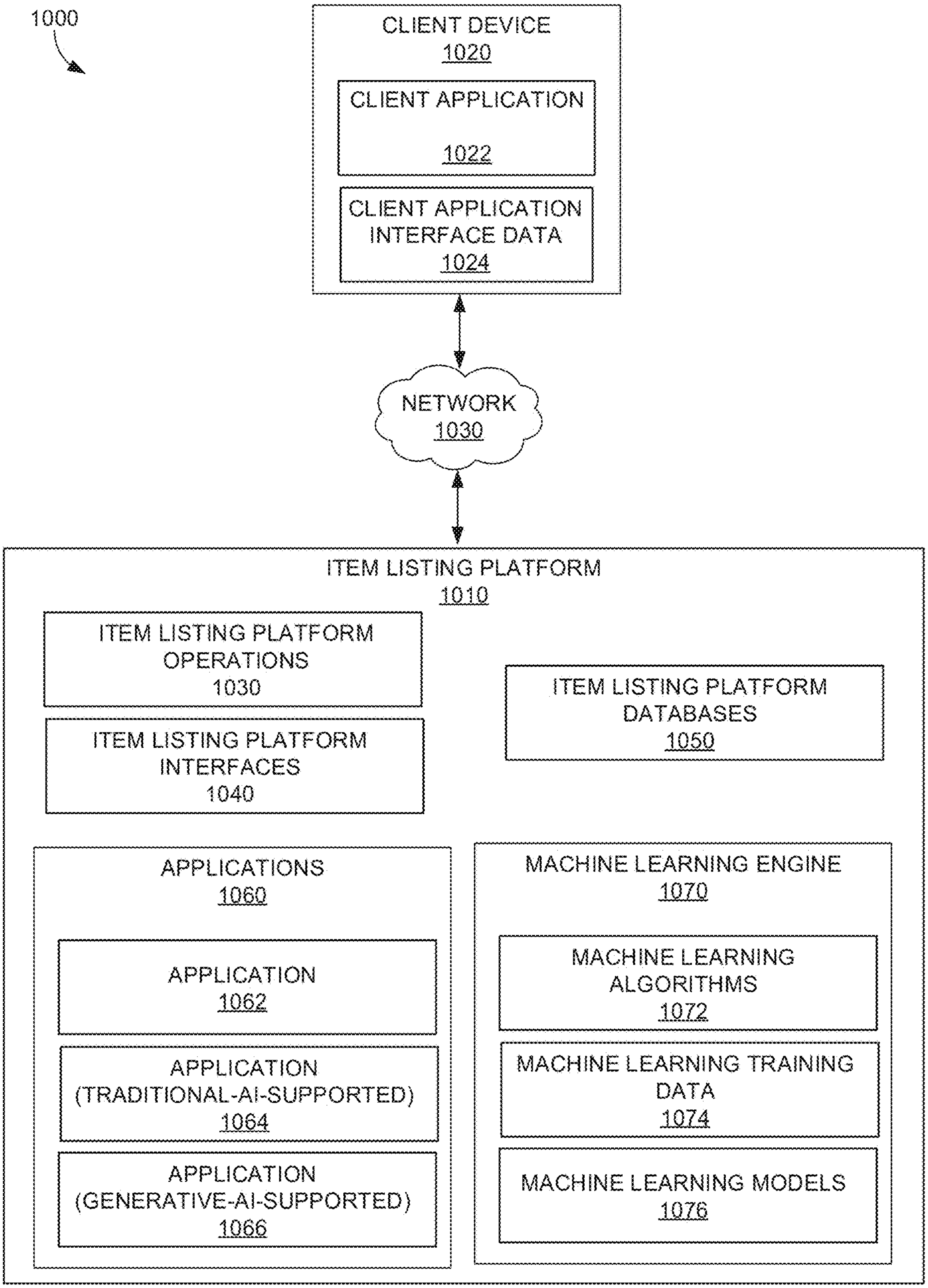
FIG. 10 provides a block diagram illustrating an exemplary item listing system computing environment suitable for use in implementing aspects of the technology described herein.

Referring now to FIG. 10, FIG. 10 provides a block diagram illustrating an exemplary item listing system 1000 computing environment in which implementations of the present disclosure may be employed. In particular, FIG. 10 shows a high level architecture of an example item listing platform 1010 that can host a technical solution environment, or a portion thereof. It should be understood that this and other arrangements described herein are set forth as examples. For example, as described above, many elements described herein may be implemented as discrete or distributed components or in conjunction with other components, and in any suitable combination and location. Other arrangements and elements (e.g., machines, interfaces, functions, orders, and groupings of functions) can be used in addition to or instead of those shown.

The item listing system 1000 can be a cloud computing environment that provides computing resources for functionality associated with the item listing platform 1010. For example, the item listing system 1000 supports delivery of computing components and services—including servers, storage, databases, networking, applications, and machine learning associated with the item listing platform 1010 and client device 1020. A plurality of client devices (e.g., client device 1020) include hardware or software that access resources on the item listing system 1000. Client device 1020 can include an application (e.g., client application 1022) and interface data (e.g., client application interface data 1024) that support client-side functionality associated with the item listing system. The plurality of client devices can access computing components of the item listing system 1000 via a network (e.g., network 1030) to perform computing operations.

The item listing platform 1010 is responsible for providing a computing environment or architecture that includes the infrastructure that supports providing item listing platform functionality (e.g., e-commerce functionality). The item listing platform support storing item in item databases and providing a search system for receiving queries and identifying search results based on the queries. The item listing platform may also provide a computing environment with features for managing, selling, buying, and recommending different types of items. Item listing platform 1010 can specifically be for a content platform such as EBAY content platform or e-commerce platform, developed by EBAY INC., of San Jose, California.

The item listing platform 1010 can provide item listing operations 1030 and item listing interfaces 1040. The item listing operations 1030 can include service operations, communication operations, resource management operations, security operations, and fault tolerance operations that support specific tasks or functions in the item listing platform 1010. The item listing interfaces 1040 can include service interfaces, communication interfaces, resource interfaces, security interfaces, and management and monitoring interfaces that support functionality between the item listing platform components. The item listing operations 1030 and item listing interfaces 1040 can enable communication, coordination and seamless functioning of the item listing system 1000.

By way of example, functionality associated with item listing platform 1010 can include shopping operations (e.g., product search and browsing, product selection and shopping cart, checkout and payment, and order tracking); user account operations (e.g., user registration and authentication, and user profiles); seller and product management operations (e.g., seller registration and product listing and inventory management); payment and financial operations (e.g., payment processing, refunds and returns); order fulfillment operations (e.g., order processing and fulfillment and inventory management); customer support and communication interfaces (e.g., customer support chat/email and notifications); security and privacy interfaces (e.g., authentication and authorization, payment security); recommendation and personalization interfaces (e.g., product recommendations and customer reviews and ratings); analytics and report interfaces (e.g., sales and inventory reports, and user behavior analytics); and APIs and Integration Interfaces (e.g., APIs for Third-Party Integration).

The item listing platform 1010 can provide item listing platform databases (e.g., item listing platform databases 1050) to manage and store different types of data efficiently. The item listing platform databases 1050 can include relational databases, NoSQL databases, search databases, cache databases, content management systems, analytics databases, payment gateway database, customer relationship management databases, log and error databases, inventory and supply chain databases, and multi-channel databases that are used in combination to efficiently manage data and provide e-commerce experience for users.

The item listing platform 1010 supports applications (e.g., applications 1060) that is a computer program or software component or service that serves a specific function or set of functions to fulfil a particular item listing platform requirement or user requirement. Applications can be client-side (user-facing) and server-side (backend). Applications can also include application without any AI support (e.g., application 1062) application supported by traditional AI model (e.g., application 1064), and applications supported by generative AI models (e.g., application 1066). By way of example, applications can include an online storefront application, mobile shopping app, admin and management console, payment gateway integration, user account and authentication application, search and recommendation engines, inventory and stock management application, order processing and fulfillment application, customer support and communication tools, content management system, analytics and report applications, marketing and promotion applications, multi-channel integration applications, log and error tracking applications, customer relationship management (CRM) applications, security applications, and APIs and web services that are used in combination to efficiently deliver e-commerce experiences for users.

The items listing platform 1010 can include a machine learning engine (e.g., machine learning engine 1070). The machine learning engine 1070 refers to machine learning framework or machine learning platform that provides the infrastructure and tools to design, train, evaluate, and deploy machine learning models. The machine learning engine 1070 can serve as the backbone for developing and deploying machine learning applications and solutions. Machine learning engine 1070 can also provide tools for visualizing data and model results, as well as interpreting model decisions to gain insights into how the model is making predictions.

The machine learning engine 1070 can provide the necessary libraries, algorithms, and utilities to perform various tasks within the machine learning workflow. The machine learning workflow can include data processing, model selection, model training, model evaluation, hyperparameter tuning, scalability, model deployment, inference, integration, customization, data visualization. Machine learning engine 1070 can include pre-trained models for various tasks, simplifying the development process. In this way, the machine learning engine 1070 can streamline the entire machine learning process, from data preparation and model training to deployment and inference, making it accessible and efficient for different types of users (e.g., customers, data scientists, machine learning engineers, and developers) working on a wide range of machine learning applications.

Machine learning engine 1070 can be implemented in the item listing system 1000 as a component that leverages machine learning algorithms and techniques (e.g., machine learning algorithms 1072) to enhance various aspects of the item listing system's functionality. Machine learning engine 1070 can provide a selection of machine learning algorithms and techniques used to teach computers to learn from data and make predictions or decisions without being explicitly programmed. These techniques are widely used in various applications across different industries, and can include the following examples: supervised learning (e.g., linear regression: classification, support vector machines (SVM); unsupervised learning (e.g., clustering, principal component analysis (PCA), association rules (e.g., a priori); reinforcement learning (e.g., Q-Learning, deep Q-Network (DQN); and deep learning (e.g., neural networks, convolutional neural networks (CNN), and recurrent neural networks (RNN); and ensemble learning random forest.

Machine learning training data 1074 supports the process of building, training, and fine-tuning machine learning models. Machine learning training data 1074 consists of a labeled dataset that is used to teach a machine learning model to recognize patterns, make predictions, or perform specific tasks. Training data typically comprises two main components: input feature (X) and labels or target values (Y). Input features can include variables, attributes, or characteristics used as input to the machine learning model. Input features (X) can be numeric, categorical, or even textual, depending on the nature of the problem. For example, in a model for predicting house prices, input features might include the number of bedrooms, square footage, neighborhood, and so on. Labels or target values (Y) include the values that the model aims to predict or classify. Labels represent the desired output or the ground truth for each corresponding set of input features. For instance, in a spam email classifier, the labels would indicate whether each email is spam or not (i.e., binary classification) . The training process involves presenting the model with the training data, and the model learns to make predictions or decisions by identifying patterns and relationships between the input features (X) and the target values (Y). A machine learning algorithm adjusts its internal parameters during training in order to minimize the difference between its predictions and the actual labels in the training data. Machine learning engine 1070 can use historical and real-time data to train models and make predictions, continually improving performance and user experience.

Machine learning engine 1070 can include machine learning models (e.g., machine learning models 1076) generated using the machine learning engine workflow. Machine learning models 1076 can include generative AI models and traditional AI models that can both be employed in the item listing system 1000. Generative AI models are designed to generate new data, often in the form of text, images, or other media, based on patterns and knowledge learned from existing data. Generative AI models can be employed in various ways including: content generation, product image generation, personalized product recommendations, natural language chatbots, and content summarization. Traditional AI models encompass a wide range of algorithms and techniques and can be employed in various ways including: recommendation systems, predictive analytics, search algorithms, fraud detection, customer segmentation, image classification, Natural Language Processing (NLP) and A/B testing and optimization. In many cases, a combination of both generative and traditional AI models can be employed to provide a well-rounded and effective e-commerce experience, combining data-driven insights and creativity.

Machine learning engine 1070 can be used to analyze data, make predictions, and automate processes to provide a more personalized and efficient shopping experience for users. By way of example, product recommendations search and filtering: pricing optimization, inventory and stock management: customer segmentation, churn prediction and retention, fraud detection, sentiment analysis, customer support and chatbots, image and video analysis, and ad targeting and marketing. The specific applications of machine learning within the item listing platform 1010 can vary depending on the specific goals, available data, and resources.

Example Distributed Computing System Environment

Figure 11:
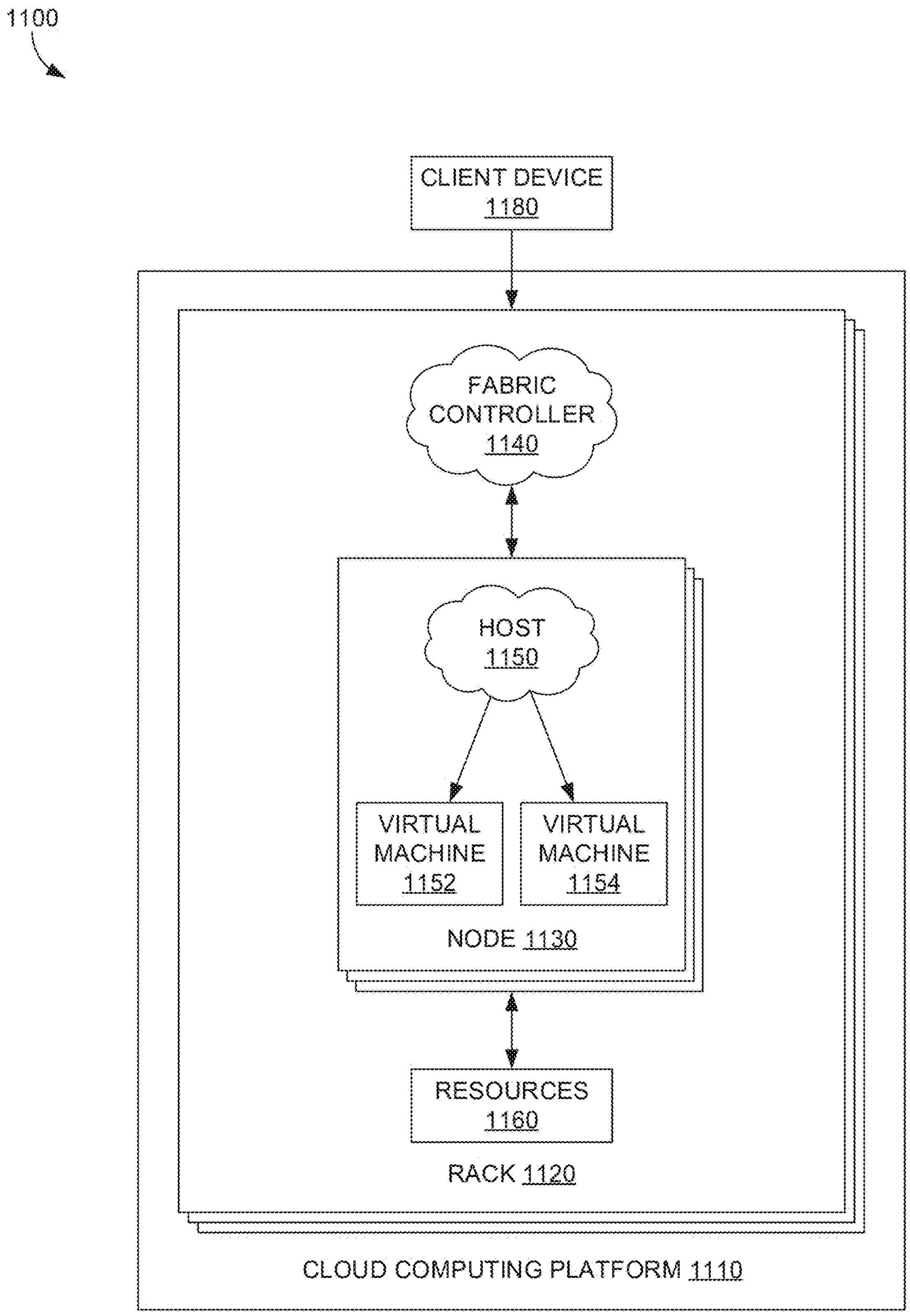
FIG. 11 provides a block diagram illustrating an exemplary distributed computing environment suitable for use in implementing aspects of the technology described herein.

Referring now to FIG. 11, FIG. 11 provides a block diagram illustrating an example distributed computing environment 1100 in which implementations of the present disclosure may be employed. In particular, FIG. 11 shows a high level architecture of an example cloud computing platform 1110 that can host a technical solution environment, or a portion thereof (e.g., a data trustee environment). It should be understood that this and other arrangements described herein are set forth only as examples. For example, as described above, many of the elements described herein may be implemented as discrete or distributed components or in conjunction with other components, and in any suitable combination and location. Other arrangements and elements (e.g., machines, interfaces, functions, orders, and groupings of functions) can be used in addition to or instead of those shown.

Data centers can support distributed computing environment 1100 that includes cloud computing platform 1110, rack 1120, and node 1130 (e.g., computing devices, processing units, or blades) in rack 1120. The technical solution environment can be implemented with cloud computing platform 1110 that runs cloud services across different data centers and geographic regions. Cloud computing platform 1110 can implement fabric controller 1140 component for provisioning and managing resource allocation, deployment, upgrade, and management of cloud services. Typically, cloud computing platform 1110 acts to store data or run service applications in a distributed manner. Cloud computing infrastructure 1110 in a data center can be configured to host and support operation of endpoints of a particular service application. Cloud computing infrastructure 1110 may be a public cloud, a private cloud, or a dedicated cloud.

Node 1130 can be provisioned with host 1150 (e.g., operating system or runtime environment) running a defined software stack on node 1130. Node 1130 can also be configured to perform specialized functionality (e.g., compute nodes or storage nodes) within cloud computing platform 1110. Node 1130 is allocated to run one or more portions of a service application of a tenant. A tenant can refer to a customer utilizing resources of cloud computing platform 1110. Service application components of cloud computing platform 1110 that support a particular tenant can be referred to as a multi-tenant infrastructure or tenancy. The terms service application, application, or service are used interchangeably herein and broadly refer to any software, or portions of software, that run on top of, or access storage and compute device locations within, a datacenter.

When more than one separate service application is being supported by nodes 1130, nodes 1130 may be partitioned into virtual machines (e.g., virtual machine 1152 and virtual machine 1154). Physical machines can also concurrently run separate service applications. The virtual machines or physical machines can be configured as individualized computing environments that are supported by resources 1160 (e.g., hardware resources and software resources) in cloud computing platform 1110. It is contemplated that resources can be configured for specific service applications. Further, each service application may be divided into functional portions such that each functional portion is able to run on a separate virtual machine. In cloud computing platform 1110, multiple servers may be used to run service applications and perform data storage operations in a cluster. In particular, the servers may perform data operations independently but exposed as a single device referred to as a cluster. Each server in the cluster can be implemented as a node.

Client device 1180 may be linked to a service application in cloud computing platform 1110. Client device 1180 may be any type of computing device, which may correspond to computing device 1200 described with reference to FIG. 12, for example, client device 1180 can be configured to issue commands to cloud computing platform 1110. In embodiments, client device 1180 may communicate with service applications through a virtual Internet Protocol (IP) and load balancer or other means that direct communication requests to designated endpoints in cloud computing platform 1110. The components of cloud computing platform 1110 may communicate with each other over a network (not shown), which may include, without limitation, one or more local area networks (LANs) and/or wide area networks (WANs).

Example Computing Environment

Figure 12:
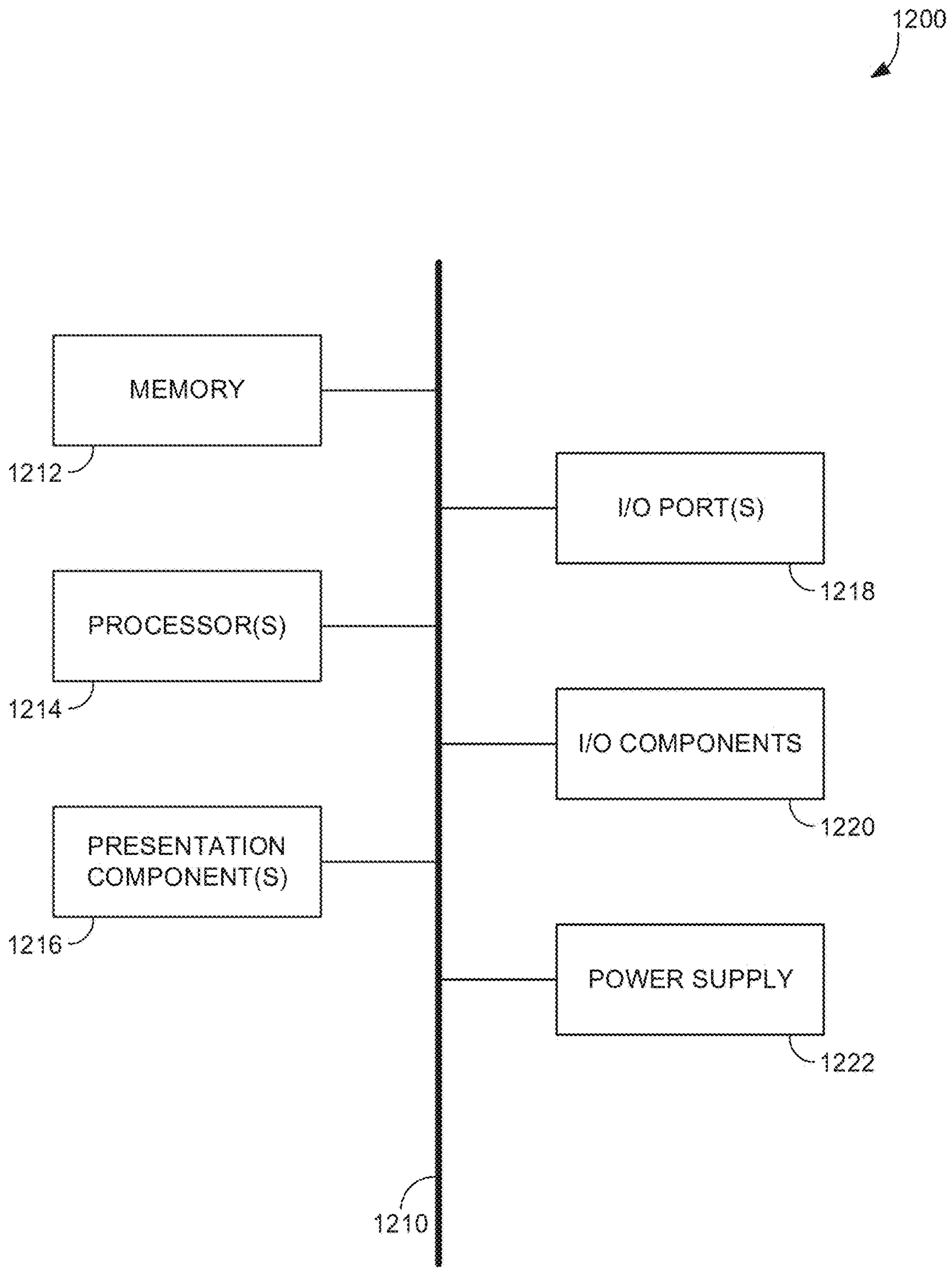
FIG. 12 provides a block diagram illustrating an exemplary computing environment suitable for use in implementations of the present disclosure.

Having briefly described an overview of embodiments of the present invention, an example operating environment in which embodiments of the present invention may be implemented is described below in order to provide a general context for various aspects of the present invention. Referring initially to FIG. 12 in particular, FIG. 12 provides a block diagram illustrating an example operating environment for implementing embodiments of the present invention is shown and designated generally as computing device 1200. Computing device 1200 is but one example of a suitable computing environment and is not intended to suggest any limitation as to the scope of use or functionality of the invention. Neither should computing device 1200 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc. refer to code that perform particular tasks or implement particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

With reference to FIG. 12, computing device 1200 includes bus 1210 that directly or indirectly couples the following devices: memory 1212, one or more processors 1214, one or more presentation components 1216, input/output ports 1218, input/output components 1220, and illustrative power supply 1222. Bus 1210 represents what may be one or more buses (such as an address bus, data bus, or combination thereof). The various blocks of FIG. 12 are shown with lines for the sake of conceptual clarity, and other arrangements of the described components and/or component functionality are also contemplated. For example, one may consider a presentation component such as a display device to be an I/O component. Also, processors have memory. We recognize that such is the nature of the art, and reiterate that the diagram of FIG. 12 is merely illustrative of an example computing device that can be used in connection with one or more embodiments of the present invention. Distinction is not made between such categories as "workstation," "server," "laptop," "hand-held device," etc., as all are contemplated within the scope of FIG. 12 and reference to "computing device."

Computing device 1200 typically includes a variety of computer-readable media. Computer-readable media can be any available media that can be accessed by computing device 1200 and includes both volatile and nonvolatile media, removable and non-removable media. By way of example, and not limitation, computer-readable media may comprise computer storage media and communication media.

Computer storage media include volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 1200. Computer storage media excludes signals per se.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 1212 includes computer storage media in the form of volatile and/or nonvolatile memory. The memory may be removable, non-removable, or a combination thereof. Exemplary hardware devices include solid-state memory, hard drives, optical-disc drives, etc. Computing device 1200 includes one or more processors that read data from various entities such as memory 1212 or I/O components 1220. Presentation component(s) 1216 present data indications to a user or other device. Exemplary presentation components include a display device, speaker, printing component, vibrating component, etc.

I/O ports 1218 allow computing device 1200 to be logically coupled to other devices including I/O components 1220, some of which may be built in. Illustrative components include a microphone, joystick, game pad, satellite dish, scanner, printer, wireless device, etc.

Additional Structural and Functional Features of Embodiments of the Technical Solution Having identified various components utilized herein, it should be understood that any number of components and arrangements may be employed to achieve the desired functionality within the scope of the present disclosure. For example, the components in the embodiments depicted in the figures are shown with lines for the sake of conceptual clarity. Other arrangements of these and other components may also be implemented. For example, although some components are depicted as single components, many of the elements described herein may be implemented as discrete or distributed components or in conjunction with other components, and in any suitable combination and location. Some elements may be omitted altogether. Moreover, various functions described herein as being performed by one or more entities may be carried out by hardware, firmware, and/or software, as described below. For instance, various functions may be carried out by a processor executing instructions stored in memory. As such, other arrangements and elements (e.g., machines, interfaces, functions, orders, and groupings of functions) can be used in addition to or instead of those shown.

Embodiments described in the paragraphs below may be combined with one or more of the specifically described alternatives. In particular, an embodiment that is claimed may contain a reference, in the alternative, to more than one other embodiment. The embodiment that is claimed may specify a further limitation of the subject matter claimed.

The subject matter of embodiments of the invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

For purposes of this disclosure, the word "including" has the same broad meaning as the word "comprising," and the word "accessing" comprises "receiving," "referencing," or "retrieving." Further the word "communicating" has the same broad meaning as the word "receiving," or "transmitting" facilitated by software or hardware-based buses, receivers, or transmitters using communication media described herein. In addition, words such as "a" and "an," unless otherwise indicated to the contrary, include the plural as well as the singular. Thus, for example, the constraint of "a feature" is satisfied where one or more features are present. Also, the term "or" includes the conjunctive, the disjunctive, and both (a or b thus includes either a or b, as well as a and b).

For purposes of a detailed discussion above, embodiments of the present invention are described with reference to a distributed computing environment; however the distributed computing environment depicted herein is merely exemplary. Components can be configured for performing novel aspects of embodiments, where the term "configured for"

can refer to "programmed to" perform particular tasks or implement particular abstract data types using code. Further, while embodiments of the present invention may generally refer to the technical solution environment and the schematics described herein, it is understood that the techniques described may be extended to other implementation contexts.

Embodiments of the present invention have been described in relation to particular embodiments which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects hereinabove set forth together with other advantages which are obvious and which are inherent to the structure.

It will be understood that certain features and sub-combinations are of utility and may be employed without reference to other features or sub-combinations. This is contemplated by and is within the scope of the claims.

What is claimed is:

1. A computer-implemented method comprising:

using a network proxy, initiating a client-side network testing process associated with a network and an application during a development phase of the application;

intercepting, at the network proxy, one or more outbound network requests from the application via the network, wherein each of the one or more outbound network requests comprises application-requested-inputs including specific data that the application generates for server communications via the network;

using the one or more outbound network requests from the application, generating, during the development phase of the application, a network signature of the application, wherein the network signature is based on the application-requested-inputs of the application;

accessing a baseline network signature of the application, wherein the baseline network signature is based on previously-recorded application-requested-inputs associated with the application executing previous outbound network requests via the network; and generating a client-side network test result based on comparing the network signature of the application to the baseline network signature of the application that supports identifying one or more application-requested-input variances relative to the baseline network signature of the application.

2. The computer-implemented method of claim 1, wherein the client-side network testing process supports testing outbound network requests from applications to determine deviations of the outbound network requests from baseline outbound network requests of the applications.

3. The computer-implemented method of claim 1, wherein comparing the network signature comprises identifying variances in application-requested-inputs associated with the one or more outbound network requests.

4. The computer-implemented method of claim 1, wherein the network signature of the application is a defined representation of characteristics of application-requested-inputs including order, structure, and specification of the application-requested-inputs.

5. The computer-implemented method of claim 1, wherein the network signature generated during the development phase of the application is based on monitoring, recording, and validating expected outbound network requests from the application during the development phase of the application.

6. The computer-implemented method of claim 1, wherein an application-requested-input variance of the one or more application-requested-input variances relative to the baseline network signature of the application comprises differences or changes in types, formats, requirements, or validation rules of application-requested-inputs from the application.

7. The computer-implemented method of claim 1, the method further comprising:

accessing the client-side network test result;

determining that no application-requested-input variances exist in the client-side network test result; and generating a notification indicating that no application-requested-input variances exist in the client-side network test result.

8. The computer-implemented method of claim 7, the method further comprising:

determining that the application-requested-input variance is based on an updated release of the application at client.

9. The computer-implemented method of claim 1, the method further comprising:

accessing the client-side network test result;

identifying an application-requested-input variance in the client-side network test result; and generating a notification comprising the application-requested-input variance.

10. The computer-implemented method of claim 1, wherein:

the variances detected in the comparing of the network signature are categorized as expected variances or unexpected variances;

the expected variances are caused by known application updates; and the unexpected variances are caused by errors in the application.

11. The computer-implemented method of claim 1, wherein the baseline network signature is periodically updated based on new application versions or updates to application-requested-inputs.

12. A computer-readable storage medium storing computer-usable instructions that, when used by one or more computing devices, cause the one or more computing devices to perform operations, the operations comprising:

communicating a first indication to initiate a first client-side network test associated with an application during a development phase of the application, wherein the first client-side network test causes generation of a baseline network signature of the application, wherein the baseline network signature is based on a first set of outbound network requests;

communicating a second indication to initiate a second client-side network test associated with the application, wherein the second client-side network test causes generation of a network signature of the application, wherein the network signature of the application is generated during the development phase of the application and wherein the network signature of the application is based on subsequent outbound network requests;

communicating a request for a client-side network test result that supports identifying one or more application-requested-input variances between the baseline network signature and the network signature, wherein the client-side network test result is generated based comparing the network signature to the baseline network signature to identify the one or more application-requested-input variances in application-requested-inputs;

based on communicating the request, receiving the client-side network test result; and causing display of the client-side test result.

13. The computer-readable storage medium of claim 12, wherein custom rules are applied to define acceptable variances in application-requested-inputs, such that variances outside of one or more predefined thresholds are flagged as anomalies.

14. The computer-readable storage medium of claim 12, wherein the comparing of the network signature further includes validating data types, formats, or validation rules of the application-requested-inputs against specified specifications.

15. The computer-readable storage medium of claim 12, wherein the client-side network test result includes a detailed report of each identified application-requested-input variance, specifying type, nature, and potential impact of each variance.

16. A computer system comprising:

one or more processors; and one or more computer storage medium storing computer-usable instructions that, when used by the one or more processors, causes the computer system to perform operations comprising:

using a network proxy, initiating a client-side network testing process associated with a network and an application during a development phase of the application;

intercepting, at the network proxy, one or more outbound network requests from the application via the network, wherein an outbound network request comprises application-requested-inputs including specific data that the application generates for server communications via the network;

using the one or more outbound network requests from the application, generating, during the development phase of the application, a network signature of the application, wherein the network signature is generated based on the application-requested-inputs of the application;

accessing a baseline network signature of the application, wherein the baseline network signature is based on previously-recorded application-requested-inputs associated with the application executing previous outbound network requests via the network; and generating a client-side network test result based on comparing the network signature of the application to the baseline network signature of the application that supports identifying one or more application-requested-input variances relative to the baseline network signature of the application.

17. The computer system of claim 16, the operations further comprising:

accessing the client-side network test result;

determining that no application-requested-input variances exist in the client-side network test result; and generating a notification indicating that no application-requested-input variances exist in the client-side network test result.

18. The computer system of claim 16, the operations further comprising:

accessing the client-side network test result;

identifying an application-requested-input variance in the client-side network test result;

generating a notification comprising the application-requested-input variance; and determining that the application-requested-input variance is based on an updated release of the application at client.

19. The computer system of claim 16, wherein the variances detected in the comparing of the network signature are expected variances, the expected variances caused by known application updates.

20. The computer system of claim 16, wherein the variances detected in the comparing of the network signature are unexpected variances, the unexpected variances caused by errors in the application.

* * * * *